US009094798B2

(12) United States Patent
Root et al.

(10) Patent No.: US 9,094,798 B2
(45) Date of Patent: Jul. 28, 2015

(54) INTERACTIVE ADVISORY SYSTEM

(71) Applicant: LOCATOR IP, L.P., State College, PA (US)

(72) Inventors: Steven A. Root, Edmond, OK (US); Michael R. Root, Edmond, OK (US)

(73) Assignee: LOCATOR IP, L.P., State College, PA (US)

(*) Notice: Subject to any disclaimer, the term of this patent is extended or adjusted under 35 U.S.C. 154(b) by 0 days.

(21) Appl. No.: 14/568,708

(22) Filed: Dec. 12, 2014

(65) Prior Publication Data

US 2015/0099542 A1 Apr. 9, 2015

Related U.S. Application Data

(63) Continuation of application No. 14/069,707, filed on Nov. 1, 2013, which is a continuation of application No. 13/077,200, filed on Mar. 31, 2011, now Pat. No. 8,611,927, which is a continuation of application No. 11/334,898, filed on Jan. 19, 2006, now Pat. No. 8,229,467.

(51) Int. Cl.
H04W 24/00 (2009.01)
H04W 4/02 (2009.01)
H04L 29/08 (2006.01)

(52) U.S. Cl.
CPC ............ *H04W 4/028* (2013.01); *H04L 67/306* (2013.01)

(58) Field of Classification Search
CPC ... H04W 4/02; H04W 64/00; H04L 29/08657
USPC ............. 455/456.1, 456.2, 414.1, 404.1, 410
See application file for complete search history.

(56) References Cited

U.S. PATENT DOCUMENTS

| 4,015,366 | A | 4/1977 | Hall, III |
| 4,438,439 | A | 3/1984 | Shreve |
| 4,459,682 | A | 7/1984 | Mossberg |
| 4,473,844 | A | 9/1984 | Klein |
| 4,521,857 | A | 6/1985 | Reynolds, III |
| 4,529,982 | A | 7/1985 | Karlstrom et al. |
| 4,577,109 | A | 3/1986 | Hirschfeld |
| 4,586,827 | A | 5/1986 | Hirsch et al. |
| 4,755,942 | A | 7/1988 | Gardner et al. |

(Continued)

FOREIGN PATENT DOCUMENTS

| AU | 2001277030 B2 | 3/2006 |
| AU | 2006204945 A1 | 7/2006 |

(Continued)

OTHER PUBLICATIONS

Author Unknown, "The Nexterna Clearview Dispatch Module," 2005, 2 pp., Nexterna Limited, Burlington, Ontario, Canada.

(Continued)

Primary Examiner — Nghi H Ly
(74) Attorney, Agent, or Firm — Blank Rome LLP

(57) ABSTRACT

A method for locating at least one individual located remotely from a broadcast network. An analysis unit compares user profiles, dynamic locations stored in the communicator location database, and/or fixed locations entered into the analysis unit. A data set of at least one matching individualized locatee user profile is generated and the individualized locatee user profile is transmitted to the locator via the locator's communicator device.

20 Claims, 5 Drawing Sheets

(56) References Cited

U.S. PATENT DOCUMENTS

| | | |
|---|---|---|
| 4,774,658 A | 9/1988 | Lewin |
| 4,892,335 A | 1/1990 | Taft |
| 4,901,300 A | 2/1990 | Van Der Zande et al. |
| 4,945,355 A | 7/1990 | Blanchette |
| 4,972,319 A | 11/1990 | Delorme |
| 5,086,394 A | 2/1992 | Shapira |
| 5,111,111 A | 5/1992 | Stevens et al. |
| 5,111,391 A | 5/1992 | Fields et al. |
| 5,117,353 A | 5/1992 | Stipanovich et al. |
| 5,122,959 A | 6/1992 | Nathanson et al. |
| 5,131,020 A | 7/1992 | Liebesny et al. |
| 5,206,903 A | 4/1993 | Kohler et al. |
| 5,250,955 A | 10/1993 | Major et al. |
| 5,298,760 A | 3/1994 | Fuchs et al. |
| 5,365,290 A | 11/1994 | Suzuki et al. |
| 5,398,021 A | 3/1995 | Moore |
| 5,416,694 A | 5/1995 | Parrish et al. |
| 5,434,565 A | 7/1995 | Simon et al. |
| 5,442,147 A | 8/1995 | Burns et al. |
| 5,444,444 A | 8/1995 | Ross |
| 5,448,696 A | 9/1995 | Shimada et al. |
| 5,467,268 A | 11/1995 | Sisley et al. |
| 5,481,254 A | 1/1996 | Gaskill et al. |
| 5,486,830 A | 1/1996 | Axline, Jr. et al. |
| 5,493,709 A | 2/1996 | Duckeck et al. |
| 5,528,678 A | 6/1996 | Kaplan |
| 5,544,140 A | 8/1996 | Seagrave et al. |
| 5,550,981 A | 8/1996 | Bauer et al. |
| 5,555,446 A | 9/1996 | Jasinski |
| 5,606,699 A | 2/1997 | De Pauw et al. |
| 5,607,187 A | 3/1997 | Salive et al. |
| 5,615,121 A | 3/1997 | Babayev et al. |
| 5,615,223 A | 3/1997 | Carr |
| 5,615,400 A | 3/1997 | Cowsar et al. |
| 5,628,050 A | 5/1997 | McGraw et al. |
| 5,634,057 A | 5/1997 | Dickinson |
| 5,642,303 A | 6/1997 | Small et al. |
| 5,649,182 A | 7/1997 | Reitz |
| 5,671,412 A | 9/1997 | Christiano |
| 5,684,476 A | 11/1997 | Anderson |
| 5,689,650 A | 11/1997 | McClelland et al. |
| 5,706,505 A | 1/1998 | Fraley et al. |
| 5,717,589 A | 2/1998 | Thompson et al. |
| 5,725,253 A | 3/1998 | Salive et al. |
| 5,754,782 A | 5/1998 | Masada |
| 5,757,322 A | 5/1998 | Ray et al. |
| 5,764,906 A | 6/1998 | Edelstein et al. |
| 5,768,577 A | 6/1998 | Kleewein et al. |
| 5,790,664 A | 8/1998 | Coley et al. |
| 5,790,953 A | 8/1998 | Wang et al. |
| 5,794,234 A | 8/1998 | Church et al. |
| 5,819,227 A | 10/1998 | Obuchi |
| 5,828,843 A | 10/1998 | Grimm et al. |
| 5,839,088 A | 11/1998 | Hancock et al. |
| 5,845,276 A | 12/1998 | Emerson et al. |
| 5,848,131 A | 12/1998 | Shaffer et al. |
| 5,848,378 A | 12/1998 | Shelton et al. |
| 5,864,860 A | 1/1999 | Holmes |
| 5,864,875 A | 1/1999 | Van Huben et al. |
| 5,867,109 A | 2/1999 | Wiedeman |
| 5,867,110 A | 2/1999 | Naito et al. |
| 5,867,821 A | 2/1999 | Ballantyne et al. |
| 5,880,958 A | 3/1999 | Helms et al. |
| 5,884,267 A | 3/1999 | Goldenthal et al. |
| 5,884,309 A | 3/1999 | Vanechanos, Jr. |
| 5,892,917 A | 4/1999 | Myerson |
| 5,893,905 A | 4/1999 | Main et al. |
| 5,913,201 A | 6/1999 | Kocur |
| 5,948,041 A | 9/1999 | Abo et al. |
| 5,950,161 A | 9/1999 | Kozuma et al. |
| 5,963,130 A | 10/1999 | Schlager et al. |
| 5,974,447 A | 10/1999 | Cannon et al. |
| 5,991,735 A | 11/1999 | Gerace |
| 5,999,126 A | 12/1999 | Ito |
| 5,999,882 A | 12/1999 | Simpson et al. |
| 6,000,285 A | 12/1999 | Leslie et al. |
| 6,014,090 A | 1/2000 | Rosen et al. |
| 6,018,699 A | 1/2000 | Baron, Sr. et al. |
| 6,023,223 A | 2/2000 | Baxter, Jr. |
| 6,023,765 A | 2/2000 | Kuhn |
| 6,028,514 A | 2/2000 | Lemelson et al. |
| 6,031,455 A | 2/2000 | Grube et al. |
| 6,040,781 A | 3/2000 | Murray |
| 6,043,756 A | 3/2000 | Bateman et al. |
| 6,047,236 A | 4/2000 | Hancock et al. |
| 6,047,327 A | 4/2000 | Tso et al. |
| 6,049,776 A | 4/2000 | Donnelly et al. |
| 6,070,142 A | 5/2000 | McDonough et al. |
| 6,070,143 A | 5/2000 | Barney et al. |
| 6,078,260 A | 6/2000 | Desch |
| 6,084,510 A | 7/2000 | Lemelson et al. |
| 6,088,679 A | 7/2000 | Barkley |
| 6,091,959 A | 7/2000 | Souissi et al. |
| 6,094,509 A | 7/2000 | Zheng et al. |
| 6,098,048 A | 8/2000 | Dashefsky et al. |
| 6,100,806 A | 8/2000 | Gaukel |
| 6,108,699 A | 8/2000 | Moiin |
| 6,112,074 A | 8/2000 | Pinder |
| 6,133,912 A | 10/2000 | Montero |
| 6,134,530 A | 10/2000 | Bunting et al. |
| 6,138,073 A | 10/2000 | Uchigaki |
| 6,148,261 A | 11/2000 | Obradovich et al. |
| 6,161,092 A | 12/2000 | Latshaw et al. |
| 6,167,255 A | 12/2000 | Kennedy, III et al. |
| 6,185,427 B1 | 2/2001 | Krasner et al. |
| 6,199,045 B1 | 3/2001 | Giniger et al. |
| 6,202,023 B1 | 3/2001 | Hancock et al. |
| 6,209,026 B1 | 3/2001 | Ran et al. |
| 6,212,393 B1 | 4/2001 | Suarez et al. |
| 6,219,667 B1 | 4/2001 | Lu et al. |
| 6,233,122 B1 | 5/2001 | Summers |
| 6,240,369 B1 | 5/2001 | Foust |
| 6,252,544 B1 | 6/2001 | Hoffberg |
| 6,266,612 B1 | 7/2001 | Dussell et al. |
| 6,269,309 B1 | 7/2001 | Buckingham |
| 6,275,774 B1 | 8/2001 | Baron, Sr. et al. |
| 6,295,502 B1 | 9/2001 | Hancock et al. |
| 6,297,766 B1 | 10/2001 | Koeller |
| 6,329,904 B1 | 12/2001 | Lamb |
| 6,333,980 B1 | 12/2001 | Hollatz et al. |
| 6,334,133 B1 | 12/2001 | Thompson et al. |
| 6,339,744 B1 | 1/2002 | Hancock et al. |
| 6,339,747 B1 | 1/2002 | Daly et al. |
| 6,347,216 B1 | 2/2002 | Marko et al. |
| 6,351,218 B1 | 2/2002 | Smith |
| 6,356,834 B2 | 3/2002 | Hancock et al. |
| 6,360,172 B1 | 3/2002 | Burfeind et al. |
| 6,363,411 B1 | 3/2002 | Dugan et al. |
| 6,381,535 B1 | 4/2002 | Durocher et al. |
| 6,405,134 B1 | 6/2002 | Smith et al. |
| 6,408,337 B1 | 6/2002 | Dietz et al. |
| 6,411,687 B1 | 6/2002 | Bohacek et al. |
| 6,411,809 B1 | 6/2002 | Haakana et al. |
| 6,418,371 B1 | 7/2002 | Arnold |
| 6,430,562 B1 | 8/2002 | Kardos et al. |
| 6,446,004 B1 | 9/2002 | Cao et al. |
| 6,456,852 B2 | 9/2002 | Bar et al. |
| 6,469,664 B1 | 10/2002 | Michaelson et al. |
| 6,473,692 B2 | 10/2002 | Hancock et al. |
| 6,484,033 B2 | 11/2002 | Murray |
| 6,490,525 B2 | 12/2002 | Baron, Sr. et al. |
| 6,496,776 B1 | 12/2002 | Blumberg et al. |
| 6,498,987 B1 | 12/2002 | Wilt et al. |
| 6,501,392 B2 | 12/2002 | Gremmert et al. |
| 6,505,123 B1 | 1/2003 | Root et al. |
| 6,522,875 B1 | 2/2003 | Dowling et al. |
| 6,522,888 B1 | 2/2003 | Garceran et al. |
| 6,526,268 B1 | 2/2003 | Marrah et al. |
| 6,531,218 B2 | 3/2003 | Hoyt et al. |
| 6,542,825 B2 | 4/2003 | Jones et al. |
| 6,553,317 B1 | 4/2003 | Lincoln et al. |
| 6,560,456 B1 | 5/2003 | Lohtia et al. |
| 6,564,143 B1 | 5/2003 | Alewine et al. |
| 6,571,279 B1 | 5/2003 | Herz et al. |

(56) References Cited

U.S. PATENT DOCUMENTS

| | | |
|---|---|---|
| 6,578,005 B1 | 6/2003 | Lesaint et al. |
| 6,587,813 B1 | 7/2003 | Whitt et al. |
| 6,587,831 B1 | 7/2003 | O'Brien |
| 6,587,851 B1 | 7/2003 | Ditcharo et al. |
| 6,590,529 B2 | 7/2003 | Schwoegler |
| 6,597,983 B2 | 7/2003 | Hancock |
| 6,603,405 B2 | 8/2003 | Smith |
| 6,609,062 B2 | 8/2003 | Hancock |
| 6,611,687 B1 | 8/2003 | Clark et al. |
| 6,618,593 B1 | 9/2003 | Drutman et al. |
| 6,633,900 B1 | 10/2003 | Khalessi et al. |
| 6,646,559 B2 | 11/2003 | Smith |
| 6,647,257 B2 | 11/2003 | Owensby |
| 6,650,902 B1 | 11/2003 | Richton |
| 6,654,689 B1 | 11/2003 | Kelly et al. |
| 6,675,151 B1 | 1/2004 | Thompson et al. |
| 6,677,894 B2 | 1/2004 | Sheynblat et al. |
| 6,680,675 B1 | 1/2004 | Suzuki |
| 6,684,136 B2 | 1/2004 | Sinex |
| 6,697,859 B1 | 2/2004 | Takahashi |
| 6,707,905 B2 | 3/2004 | Lenard |
| 6,731,940 B1 | 5/2004 | Nagendran |
| 6,742,002 B2 | 5/2004 | Arrowood |
| 6,745,021 B1 | 6/2004 | Stevens |
| 6,751,553 B2 | 6/2004 | Young et al. |
| 6,753,784 B1 | 6/2004 | Sznaider et al. |
| 6,754,585 B2 | 6/2004 | Root et al. |
| 6,792,615 B1 | 9/2004 | Rowe et al. |
| 6,798,358 B2 | 9/2004 | Joyce et al. |
| 6,812,855 B1 | 11/2004 | Sudou et al. |
| 6,823,263 B1 | 11/2004 | Kelly et al. |
| 6,823,315 B1 | 11/2004 | Bucci et al. |
| 6,826,481 B2 | 11/2004 | Root et al. |
| 6,829,233 B1 | 12/2004 | Gilboy |
| 6,829,334 B1 | 12/2004 | Zirngibl et al. |
| 6,836,730 B2 | 12/2004 | Root et al. |
| 6,838,998 B1 | 1/2005 | Brown et al. |
| 6,845,324 B2 | 1/2005 | Smith |
| 6,850,895 B2 | 2/2005 | Brodersen et al. |
| 6,853,915 B2 | 2/2005 | Hubschneider et al. |
| 6,865,538 B2 | 3/2005 | Chithambaram et al. |
| 6,909,361 B2 | 6/2005 | McCarthy et al. |
| 6,909,903 B2 | 6/2005 | Wang |
| 6,912,545 B1 | 6/2005 | Lundy et al. |
| 6,941,126 B1 | 9/2005 | Jordan, Jr. |
| 6,944,443 B2 | 9/2005 | Bates et al. |
| 6,944,447 B2 | 9/2005 | Portman et al. |
| 6,962,531 B2 | 11/2005 | Pace et al. |
| 6,973,384 B2 | 12/2005 | Zhao et al. |
| 6,975,942 B2 | 12/2005 | Young et al. |
| 6,980,909 B2 | 12/2005 | Root et al. |
| 6,985,813 B2 | 1/2006 | Root et al. |
| 6,985,929 B1 | 1/2006 | Wilson et al. |
| 6,988,037 B2 | 1/2006 | Root et al. |
| 6,989,765 B2 | 1/2006 | Gueziec |
| 6,990,458 B2 | 1/2006 | Harrison et al. |
| 7,010,501 B1 | 3/2006 | Roslak et al. |
| 7,016,689 B2 | 3/2006 | Clark et al. |
| 7,024,205 B1 | 4/2006 | Hose |
| 7,024,310 B2 | 4/2006 | Root et al. |
| 7,031,724 B2 | 4/2006 | Ross et al. |
| 7,047,114 B1 | 5/2006 | Rogers |
| 7,058,510 B2 | 6/2006 | Kelly et al. |
| 7,072,666 B1 | 7/2006 | Kullman et al. |
| 7,079,631 B1 | 7/2006 | Kaufman |
| 7,084,775 B1 | 8/2006 | Smith |
| 7,089,116 B2 | 8/2006 | Smith |
| 7,096,276 B2 | 8/2006 | Bodin et al. |
| 7,103,596 B2 | 9/2006 | Abe et al. |
| 7,123,926 B2 | 10/2006 | Himmelstein |
| 7,139,664 B2 | 11/2006 | Kelly et al. |
| 7,164,986 B2 | 1/2007 | Humphries et al. |
| 7,171,325 B2 | 1/2007 | Hsu et al. |
| 7,171,372 B2 | 1/2007 | Daniel et al. |
| 7,181,345 B2 | 2/2007 | Rosenfeld et al. |
| 7,184,540 B2 | 2/2007 | Dezonno et al. |
| 7,184,896 B1 | 2/2007 | Benson |
| 7,191,064 B1 | 3/2007 | Myers et al. |
| 7,191,065 B2 | 3/2007 | Root et al. |
| 7,197,308 B2 | 3/2007 | Singhal et al. |
| 7,203,502 B2 | 4/2007 | Wilson et al. |
| 7,212,811 B2 | 5/2007 | Dowling et al. |
| 7,212,829 B1 | 5/2007 | Lau et al. |
| 7,218,938 B1 | 5/2007 | Lau et al. |
| 7,219,066 B2 | 5/2007 | Parks et al. |
| 7,221,947 B2 | 5/2007 | Casey |
| 7,231,657 B2 | 6/2007 | Honarvar et al. |
| 7,233,781 B2 | 6/2007 | Hunter et al. |
| 7,248,159 B2 | 7/2007 | Smith |
| 7,254,406 B2 | 8/2007 | Beros et al. |
| 7,254,481 B2 | 8/2007 | Yamada et al. |
| 7,254,588 B2 | 8/2007 | Sung et al. |
| 7,259,668 B2 | 8/2007 | Casey |
| 7,269,505 B2 | 9/2007 | Zhao et al. |
| 7,280,822 B2 | 10/2007 | Fraccaroli |
| 7,283,971 B1 | 10/2007 | Levine et al. |
| 7,284,000 B2 | 10/2007 | Kuehr-McLaren et al. |
| 7,284,033 B2 | 10/2007 | Jhanji |
| 7,289,908 B2 | 10/2007 | Root et al. |
| 7,299,492 B2 | 11/2007 | Thrash et al. |
| 7,315,782 B2 | 1/2008 | Root et al. |
| 7,327,271 B2 | 2/2008 | Greenstein et al. |
| 7,336,964 B2 | 2/2008 | Casey |
| 7,366,522 B2 | 4/2008 | Thomas |
| 7,392,042 B2 | 6/2008 | Bates et al. |
| 7,400,976 B2 | 7/2008 | Young et al. |
| 7,403,925 B2 | 7/2008 | Schlesinger et al. |
| 7,406,382 B2 | 7/2008 | Brulle-Drews |
| 7,411,493 B2 | 8/2008 | Smith |
| 7,412,234 B2 | 8/2008 | Zellner |
| 7,502,748 B1 | 3/2009 | Baldwin et al. |
| 7,557,730 B2 | 7/2009 | Gueziec |
| 7,567,575 B2 | 7/2009 | Chen et al. |
| 7,568,217 B1 | 7/2009 | Prasad et al. |
| 7,599,795 B1 | 10/2009 | Blumberg et al. |
| 7,602,285 B2 | 10/2009 | Sznaider et al. |
| 7,606,663 B2 | 10/2009 | Neef et al. |
| 7,647,022 B2 | 1/2010 | Ng et al. |
| 7,650,633 B2 | 1/2010 | Whitson |
| 7,668,832 B2 | 2/2010 | Yeh et al. |
| 7,706,523 B2 | 4/2010 | Agusta |
| 7,720,606 B2 | 5/2010 | Burfeind et al. |
| 7,848,765 B2 | 12/2010 | Phillips et al. |
| 7,860,376 B2 | 12/2010 | Kudo et al. |
| 7,890,124 B2 | 2/2011 | Smith et al. |
| 7,899,469 B2 | 3/2011 | Casey |
| 7,917,555 B2 | 3/2011 | Gottumukkala et al. |
| 7,970,912 B2 | 6/2011 | Bourne |
| 8,019,692 B2 | 9/2011 | Rosen |
| 8,023,929 B2 | 9/2011 | Mgrdechian et al. |
| 8,027,691 B2 | 9/2011 | Bernas et al. |
| 8,102,253 B1 | 1/2012 | Brady, Jr. |
| 8,149,697 B2 | 4/2012 | Parkkinen et al. |
| 8,204,513 B2 | 6/2012 | Crowley et al. |
| 8,229,467 B2 | 7/2012 | Root et al. |
| 8,290,506 B1 | 10/2012 | Coverstone |
| 8,295,851 B2 | 10/2012 | Finnegan et al. |
| 8,359,019 B2 | 1/2013 | Ramer et al. |
| 8,483,651 B1 | 7/2013 | Zamora et al. |
| 8,538,451 B2 | 9/2013 | Ruutu et al. |
| 8,538,458 B2 | 9/2013 | Haney |
| 8,594,715 B1 | 11/2013 | Stewart |
| 2001/0029160 A1 | 10/2001 | Aznal |
| 2001/0030624 A1 | 10/2001 | Schwoegler |
| 2001/0042001 A1 | 11/2001 | Goto et al. |
| 2001/0049584 A1 | 12/2001 | Jones et al. |
| 2001/0051888 A1 | 12/2001 | Mayhak et al. |
| 2001/0053999 A1 | 12/2001 | Feinberg |
| 2002/0000930 A1 | 1/2002 | Crowson et al. |
| 2002/0009353 A1 | 1/2002 | Kelsey et al. |
| 2002/0010615 A1 | 1/2002 | Jacobs |
| 2002/0025964 A1 | 2/2002 | Streuff et al. |
| 2002/0029160 A1 | 3/2002 | Thompson et al. |
| 2002/0029272 A1 | 3/2002 | Weller |

(56) References Cited

U.S. PATENT DOCUMENTS

| | | |
|---|---|---|
| 2002/0040313 A1 | 4/2002 | Hunter et al. |
| 2002/0046259 A1 | 4/2002 | Glorikian |
| 2002/0049310 A1 | 4/2002 | Tateishi et al. |
| 2002/0052674 A1 | 5/2002 | Chang et al. |
| 2002/0062451 A1 | 5/2002 | Scheidt et al. |
| 2002/0077876 A1 | 6/2002 | O'Meara et al. |
| 2002/0091568 A1 | 7/2002 | Kraft et al. |
| 2002/0095333 A1 | 7/2002 | Jokinen et al. |
| 2002/0147642 A1 | 10/2002 | Avallone et al. |
| 2002/0160745 A1 | 10/2002 | Wang |
| 2002/0165732 A1 | 11/2002 | Ezzeddine et al. |
| 2002/0173981 A1 | 11/2002 | Stewart |
| 2002/0183117 A1 | 12/2002 | Takahashi et al. |
| 2002/0194366 A1 | 12/2002 | Bodin et al. |
| 2003/0004780 A1 | 1/2003 | Smith et al. |
| 2003/0004802 A1 | 1/2003 | Callegari |
| 2003/0014297 A1 | 1/2003 | Kaufman et al. |
| 2003/0028410 A1 | 2/2003 | House et al. |
| 2003/0055705 A1 | 3/2003 | Kilpatrick |
| 2003/0059158 A1 | 3/2003 | Lacey |
| 2003/0060211 A1 | 3/2003 | Chern et al. |
| 2003/0068974 A1 | 4/2003 | Kanamaluru et al. |
| 2003/0100315 A1 | 5/2003 | Rankin |
| 2003/0113014 A1 | 6/2003 | Katoh |
| 2003/0125963 A1 | 7/2003 | Haken |
| 2003/0132298 A1 | 7/2003 | Swartz et al. |
| 2003/0149607 A1 | 8/2003 | Ogasawara et al. |
| 2003/0171870 A1 | 9/2003 | Gueziec |
| 2003/0191765 A1 | 10/2003 | Bargh et al. |
| 2003/0191795 A1 | 10/2003 | Bernardin et al. |
| 2003/0198337 A1 | 10/2003 | Lenard |
| 2004/0002348 A1* | 1/2004 | Fraccaroli .......... 455/456.3 |
| 2004/0010372 A1 | 1/2004 | Schwoegler |
| 2004/0010591 A1 | 1/2004 | Sinn et al. |
| 2004/0014486 A1 | 1/2004 | Carlton et al. |
| 2004/0023666 A1 | 2/2004 | Moon et al. |
| 2004/0059996 A1 | 3/2004 | Fasciano |
| 2004/0093265 A1 | 5/2004 | Ramchandani et al. |
| 2004/0107126 A1 | 6/2004 | Kataoka et al. |
| 2004/0110515 A1 | 6/2004 | Blumberg et al. |
| 2004/0120298 A1 | 6/2004 | Evans et al. |
| 2004/0161097 A1 | 8/2004 | Henry |
| 2004/0167813 A1 | 8/2004 | Robertson et al. |
| 2004/0172343 A1 | 9/2004 | Allibhoy et al. |
| 2004/0199655 A1 | 10/2004 | Davies et al. |
| 2004/0203630 A1 | 10/2004 | Wang |
| 2004/0221308 A1 | 11/2004 | Cuttner et al. |
| 2004/0267595 A1 | 12/2004 | Woodings et al. |
| 2005/0003828 A1* | 1/2005 | Sugar et al. .......... 455/456.1 |
| 2005/0021666 A1 | 1/2005 | Dinnage et al. |
| 2005/0021806 A1 | 1/2005 | Richardson et al. |
| 2005/0021980 A1 | 1/2005 | Kanai |
| 2005/0027449 A1 | 2/2005 | Marsh |
| 2005/0040847 A1 | 2/2005 | Unger et al. |
| 2005/0050008 A1 | 3/2005 | Root et al. |
| 2005/0055374 A1 | 3/2005 | Sato |
| 2005/0096040 A1 | 5/2005 | Haberman et al. |
| 2005/0096962 A1 | 5/2005 | Narasimhan et al. |
| 2005/0136917 A1 | 6/2005 | Taylor |
| 2005/0136983 A1 | 6/2005 | Agapi et al. |
| 2005/0174235 A1 | 8/2005 | Davis et al. |
| 2005/0181803 A1 | 8/2005 | Weaver et al. |
| 2005/0192724 A1 | 9/2005 | Hendry |
| 2005/0227709 A1 | 10/2005 | Chang et al. |
| 2005/0228873 A1 | 10/2005 | Tapuska et al. |
| 2005/0240378 A1 | 10/2005 | Smith et al. |
| 2005/0245243 A1 | 11/2005 | Zuniga |
| 2005/0251370 A1 | 11/2005 | Li et al. |
| 2006/0009155 A1 | 1/2006 | Paalasmaa et al. |
| 2006/0022846 A1 | 2/2006 | Tummala |
| 2006/0028400 A1 | 2/2006 | Lapstun et al. |
| 2006/0036457 A1 | 2/2006 | McNamara |
| 2006/0046740 A1 | 3/2006 | Johnson |
| 2006/0047825 A1 | 3/2006 | Steenstra et al. |
| 2006/0111089 A1 | 5/2006 | Winter et al. |
| 2006/0123053 A1 | 6/2006 | Scannell |
| 2006/0142024 A1 | 6/2006 | Thalanany et al. |
| 2006/0161469 A1 | 7/2006 | Root et al. |
| 2006/0164259 A1 | 7/2006 | Winkler et al. |
| 2006/0178140 A1 | 8/2006 | Smith et al. |
| 2006/0194595 A1 | 8/2006 | Myllynen et al. |
| 2006/0265228 A1 | 11/2006 | Ando |
| 2006/0271560 A1 | 11/2006 | Mitchell |
| 2006/0293065 A1 | 12/2006 | Chew et al. |
| 2006/0294147 A1 | 12/2006 | Root et al. |
| 2007/0005363 A1 | 1/2007 | Cucerzan et al. |
| 2007/0021906 A1 | 1/2007 | Yeh et al. |
| 2007/0024469 A1 | 2/2007 | Chou |
| 2007/0030973 A1 | 2/2007 | Mikan |
| 2007/0094071 A1 | 4/2007 | Seraji et al. |
| 2007/0112511 A1 | 5/2007 | Burfeind et al. |
| 2007/0127423 A1 | 6/2007 | Ho |
| 2007/0162320 A1 | 7/2007 | Joshi et al. |
| 2007/0162328 A1 | 7/2007 | Reich |
| 2007/0168131 A1 | 7/2007 | Root et al. |
| 2007/0168524 A1 | 7/2007 | Chao et al. |
| 2007/0192159 A1 | 8/2007 | Root et al. |
| 2007/0202844 A1 | 8/2007 | Wilson et al. |
| 2007/0260531 A1 | 11/2007 | Bezancon |
| 2007/0260708 A1 | 11/2007 | Beaton et al. |
| 2007/0260741 A1 | 11/2007 | Bezancon |
| 2007/0270165 A1 | 11/2007 | Poosala |
| 2007/0270166 A1 | 11/2007 | Hampel et al. |
| 2007/0293240 A1 | 12/2007 | Drennan |
| 2008/0021645 A1 | 1/2008 | Lau et al. |
| 2008/0064351 A1 | 3/2008 | Landschaft et al. |
| 2008/0070550 A1 | 3/2008 | Hose |
| 2008/0082264 A1 | 4/2008 | Hill et al. |
| 2008/0084857 A1 | 4/2008 | Gorti et al. |
| 2008/0134043 A1 | 6/2008 | Georgis et al. |
| 2008/0157990 A1 | 7/2008 | Belzer et al. |
| 2008/0160956 A1 | 7/2008 | Jackson et al. |
| 2008/0160966 A1 | 7/2008 | McKiou et al. |
| 2008/0161012 A1 | 7/2008 | Haran et al. |
| 2008/0183710 A1 | 7/2008 | Serjeantson et al. |
| 2008/0207183 A1 | 8/2008 | Root et al. |
| 2008/0271120 A1 | 10/2008 | Parkes et al. |
| 2008/0275759 A1 | 11/2008 | Parkes et al. |
| 2008/0294478 A1 | 11/2008 | Joshi et al. |
| 2008/0313037 A1 | 12/2008 | Root et al. |
| 2008/0319652 A1 | 12/2008 | Moshfeghi |
| 2008/0319653 A1 | 12/2008 | Moshfeghi |
| 2009/0061903 A1 | 3/2009 | Khokhar |
| 2009/0073885 A1 | 3/2009 | Jalil et al. |
| 2009/0083150 A1 | 3/2009 | Mashinsky |
| 2009/0131080 A1 | 5/2009 | Nadler et al. |
| 2009/0156161 A1 | 6/2009 | Strahs |
| 2009/0176511 A1 | 7/2009 | Morrison |
| 2009/0176512 A1 | 7/2009 | Morrison |
| 2009/0177374 A1 | 7/2009 | Liu |
| 2009/0209233 A1 | 8/2009 | Morrison |
| 2009/0210441 A1 | 8/2009 | Mercer et al. |
| 2009/0233575 A1 | 9/2009 | Morrison |
| 2009/0233633 A1 | 9/2009 | Morrison |
| 2009/0239511 A1 | 9/2009 | Chen et al. |
| 2009/0240428 A1 | 9/2009 | Shahrestani |
| 2009/0265099 A1 | 10/2009 | Gottlieb |
| 2009/0275348 A1 | 11/2009 | Weinreich et al. |
| 2009/0305645 A1 | 12/2009 | Watanabe |
| 2010/0009657 A1 | 1/2010 | Dingler et al. |
| 2010/0013629 A1 | 1/2010 | Sznaider et al. |
| 2010/0036717 A1 | 2/2010 | Trest |
| 2010/0069052 A1 | 3/2010 | Ahomaki et al. |
| 2010/0069093 A1 | 3/2010 | Morrison |
| 2012/0129553 A1 | 5/2012 | Phillips et al. |
| 2012/0166350 A1 | 6/2012 | Piccionelli et al. |
| 2013/0029693 A1 | 1/2013 | Bradley, Jr. et al. |

FOREIGN PATENT DOCUMENTS

| | | |
|---|---|---|
| AU | 2007207616 A1 | 7/2007 |
| AU | 2006202473 A1 | 1/2010 |
| CA | 2418268 A1 | 1/2002 |
| CA | 2514868 A1 | 8/2004 |

(56) References Cited

FOREIGN PATENT DOCUMENTS

| | | |
|---|---|---|
| CA | 2594001 A1 | 7/2006 |
| CN | 1230265 A | 9/1999 |
| CN | 1449615 A | 10/2003 |
| CN | 1659602 A | 8/2005 |
| CN | 1745540 A | 3/2006 |
| CN | 101083784 A | 12/2007 |
| CN | 101120316 A | 2/2008 |
| EP | 0436263 A1 | 7/1991 |
| EP | 0703463 A2 | 3/1996 |
| EP | 0798539 A2 | 10/1997 |
| EP | 1143399 A1 | 10/2001 |
| EP | 1303965 A2 | 4/2003 |
| EP | 1473684 A1 | 11/2004 |
| EP | 1593085 A2 | 11/2005 |
| EP | 1856608 A2 | 11/2007 |
| EP | 1912409 A1 | 4/2008 |
| EP | 1999665 A2 | 12/2008 |
| GB | 2201865 A | 9/1988 |
| GB | 2216319 A | 10/1989 |
| JP | 08221694 A | 8/1996 |
| JP | 10065596 A | 3/1998 |
| JP | H10-65596 A | 3/1998 |
| JP | 11-136365 A | 5/1999 |
| JP | 2000030148 A | 1/2000 |
| JP | 2000167232 A | 6/2000 |
| JP | 2001126170 A | 5/2001 |
| JP | 2001175718 A | 6/2001 |
| JP | 2002019928 A | 1/2002 |
| JP | 2002056156 A | 2/2002 |
| JP | 2002140451 A | 5/2002 |
| JP | 2002162478 A | 6/2002 |
| JP | 2002251484 A | 9/2002 |
| JP | 2002255465 | 9/2002 |
| JP | 2002255465 A | 9/2002 |
| JP | 2002269335 A | 9/2002 |
| JP | 2002303527 A | 10/2002 |
| JP | 2003099350 A | 4/2003 |
| JP | 2003186900 A | 7/2003 |
| JP | 2003196284 A | 7/2003 |
| JP | 200245339 A | 9/2003 |
| JP | 2003272078 A | 9/2003 |
| JP | 2003280561 A | 10/2003 |
| JP | 2003281694 A | 10/2003 |
| JP | 2003323528 A | 11/2003 |
| JP | 2003337874 A | 11/2003 |
| JP | 2004505501 A | 2/2004 |
| JP | 2004110496 | 4/2004 |
| JP | 2004127044 A | 4/2004 |
| JP | 2004511836 A | 4/2004 |
| JP | 2004514333 A | 5/2004 |
| JP | 2004529543 A | 9/2004 |
| JP | 2004328308 A | 11/2004 |
| JP | 2004334782 A | 11/2004 |
| JP | 2005073147 A | 3/2005 |
| JP | 2005-309489 A | 11/2005 |
| JP | 2006011617 A | 1/2006 |
| JP | 2006107136 A | 4/2006 |
| JP | 2006520497 A | 9/2006 |
| JP | 2009524150 A | 6/2009 |
| JP | 2012083743 A | 4/2012 |
| KR | 20010100635 A | 11/2001 |
| KR | 20020090910 A | 12/2002 |
| KR | 20030075238 A | 9/2003 |
| KR | 20040010513 A | 1/2004 |
| KR | 20050080370 A | 8/2005 |
| WO | WO-9607110 A1 | 3/1996 |
| WO | WO-9741654 A1 | 11/1997 |
| WO | WO-9802824 A1 | 1/1998 |
| WO | WO-9819479 A1 | 5/1998 |
| WO | WO-9923591 A1 | 5/1999 |
| WO | WO-9957700 A1 | 11/1999 |
| WO | WO-0004730 A1 | 1/2000 |
| WO | WO-0004734 A1 | 1/2000 |
| WO | WO-0004737 A1 | 1/2000 |
| WO | WO-0013047 A1 | 3/2000 |
| WO | WO-0041104 | 7/2000 |
| WO | WO-0195140 A2 | 12/2001 |
| WO | WO-0209353 A2 | 1/2002 |
| WO | WO-0221864 A1 | 3/2002 |
| WO | WO-0225964 A2 | 3/2002 |
| WO | WO-0239217 A2 | 5/2002 |
| WO | WO-0239732 A1 | 5/2002 |
| WO | WO-0249310 A2 | 6/2002 |
| WO | WO-03069576 A1 | 8/2003 |
| WO | WO-2004059996 A1 | 7/2004 |
| WO | WO-2004070993 A2 | 8/2004 |
| WO | WO-2005040847 A2 | 5/2005 |
| WO | WO-2006076460 A2 | 7/2006 |
| WO | WO-2006105088 A2 | 10/2006 |
| WO | WO-2007084458 A2 | 7/2007 |

OTHER PUBLICATIONS

Author Unknown, "Dispenser Services Inc. Selects Web-Based Field Resource Management Solution From Nexterna," PR Newswire, Aug. 14, 2002, 2 pp., ProQuest LLC, New York, NY, USA.

Author Unknown, "Nexterna Announces Newest Release of Nexterna Clearview," PR Newswire, Sep. 26, 2002, 2 pp., ProQuest LLC, New York, NY, USA.

Author Unknown, "Nexterna.com Web Pages Nexterna Inc. 2002-2003," retrieved from Archive. Org on May 20, 2009, 31 pp.

Lesaint, et al., "Dynamic Workforce Management," AI for Network: Management Systems, Apr. 14, 1997, pp. 1-5, IEE, London, UK.

Author Unknown, "MDSI Mobile Data Solution—Innovative and Effective Mobile Workforce Management," MDSI-Advantex.com, Feb. 1999, 19 pp.

Author Unknown, "MobileAria and WeatherBank Announce Partnership to Avert Delays, Increase Driver Productivity," Business Wire, Jun. 26, 2001, pp. 1-2, ProQuest LLC, New York, NY, USA.

Partyka, et al., "On the Road to Service," ORMS Today, Aug. 2000, pp. 1-8, Lionheart Publishing, Inc., Marietta, GA, USA.

Rhinehart, Ted, "City Uses GIS to monitor snow-fighting fleet," the American City & County, Apr. 1999, vol. 144, No. 4, p. 31.

Weigel, et al., "Applying GIS and OR Techniques to Solve Sears Technician-Dispatching and Home-Delivery Problems," Interfaces, Jan.-Feb. 1999, pp. 112-130, vol. 29, No. 1, Institute for Operations Research and Management Sciences.

Author Unknown, "iMedeon Announces Support for Microsoft Windows CE Devices for its Wireless, Web-Based Mobile Workforce Management Applications," Business Wire, Feb. 5, 2001, 2 pp., ProQuest LLC, New York, NY, USA.

Howard County Bureau of Highways, "Web-Enabled Snowplow Tracking System," Howard County, 1999, pp. 1-11.

Author Unknown, "Motorola iRadio(TM) System Hits the Road at Consumer Electronics Show 2001," PR Newswire, Jan. 4, 2001, pp. 1-2, ProQuest LLC, New York, NY, USA.

Le Comte, "Using Your Computer—Software Review," Weatherwise, Aug. 1991, pp. 48-51, vol. 44, No. 4.

Freedman, "Pinpoint Weather," Technology Review, Jun. 2003, pp. 52-58, vol. 106, No. 5, ABI/Inform Global.

Author Unknown, "Yahoo! and Weather.com Forge Multi-National Agreement to Provide Enhanced Weather Reports," Business Wire, Jan. 7, 2002, pp. 1-3, ProQuest LLC, New York, NY, USA.

Ohta, et al., "Real-World Community Platform: Mobile Multi-User Communication System," Multimedia Laboratories, NTT DoCoMo, Inc., 2000, pp. 601-606.

Lee, Jay et al., "Statistical Analysis with Acrview GIS," 2001, Wiley Books, pp. 1-203.

Ohbuchi, et al., "Shape-Similarity Search of Three-Dimensional Models Using Parameterized Statistics," Oct. 9-11, 2002, in the Proceedings of the 10th Pacific Conference on Computer Graphics and Applications, pp. 265-274, IEEE.

Oh et al., "A Model for Role Administration Using Organization Structure",SACMAT '02, Jun. 3-4, 2002, pp. 155-162.

Botha, R.A. et al., "Separation of duties for access control enforcement in workflow environments", IBM Systems Journal, vol. 40, No. 3, 2001, pp. 666-682.

What is Access Management?, 2AB Inc., Jan. 2004, 6 pages.

(56) References Cited

OTHER PUBLICATIONS

Harris, Shon, Mike Myer's Certification Passport CISSP, McGraw-Hill, 2002, ISBN 0-07-222578-5, Chapter 2, 54 pages.

Park, Joon S. et al., "Role-Based Access Control on the Web", ACM Transactions on Information and System Security, vol. 4, No. 1, Feb. 2001, pp. 37-71.

McCormick, Vickie L., "Using HR Information systems for HIPAA role-vased access compliance", Journal of Health Care Compliance, vol. 5, No. 2, Mar./Apr. 2003, pp. 31-32.

Langforn, Jeff, "Implementating Least Privilege at your Enterprise", SANS Institute, Jul. 5, 2003, 21 pages.

Cuppens, Frederick et al., "Modeling Contexts in the Or-BAC Model", ACSAC'03, 2003, pp. 1-10.

Principles of Least Privilege definition, Wikipedia.org, Reprinted Jul. 11, 2012, 5 pages.

Boselly, III, Edward, et al., "Road Weather Information Systems vol. 2: Implementation Guide," 1993, pp. 1-82.

Myers, "Personal Digital Radio Service," IBM Technical Disclosure Bulletin, vol. 38, No. 8, p. 315, Aug. 1995.

Vantive and MDSI to Provide Enterprise Wide Wireless Field Service Solution PR Newswire, Oct. 26, 1998.

Visual Staff Scheduler Pro Version 3.0 User Guide Atlas Business Solutions, Inc. 1997.

Maxima Advantage Call Center CRM Solutions, vol. 18, No. 7, Jan. 2000.

MobileCentrex.com Web Pages, Mobile Centrex, Mar. 2003, Retrieved from Archive.orq Oct. 15, 2008.

Dispatch definition, Retrieved from Wikipedia.orq Oct. 15, 2008.

Feldman, W. and Feldman, P., "Making Cell Phones Indispensable for Techs," Contractor; Jul. 2004; 51, 7; ABI/INFORM Global, pp. 40 and 54.

Timmins, Annmarie, Mobile Workers Sync Up, IT Support News; Dec. 1999, pp. 28 and 30.

Bisio, R., Gavazzi, F., Malaboccia, F. and Sisto, L., "Effective Resource Scheduling in Work Force Management Context for Telecommunication Work Centers," Centro Studi E. Laboratori Telecomunicazioni, Via G. Reiss Romoli, 274, 10148 Torino, Italy; pp. 1-5.

Kruse, John, "Snow and Ice Go Hi-Tech." Mobile Radio Technology Magazine, Oct. 1, 1999.

Jing, Jin et al., WHAM: Supporting Mobile Workforce and Applications in Workflow Environments Ride 2000, Research Issues in Data Engineering, Feb. 2000.

Collins, J.E. and Sisley E.M., 3M Company, "Automated Assignment and Scheduling of Service Personnel," AI in Corporate Service & Support; Apr. 1994, IEEE Expert; pp. 33-39.

Sakagumi et al., "ActiveTrace: Mobile Marketing Platform for Location and Behavior-Dependent Information Distribution and Analysis," Collection of Papers/Multimedia, Distribution, Collaboration and Mobile (DiCoMo) Symposium, Jun. 27, 2001, vol. 2001, No. 7, pp. 501-506.

Murrary R. Barrick et al.; "The Big Five Personality Dimensions and Job Performance: A Meta-Analysis"; Personnel Psychology; Spring 1991; vol. 44; No. 1; pp. 1-26.

* cited by examiner

INTERACTIVE ADVISORY SYSTEM

REFERENCE TO RELATED APPLICATIONS

The present application is a continuation of U.S. patent application Ser. No. 14/069,707 filed Nov. 1, 2013, currently pending, which is a continuation of U.S. patent application Ser. No. 13/077,200, filed Mar. 31, 2011, now U.S. Pat. No. 8,611,927, which is a continuation of U.S. patent application Ser. No. 11/334,898, filed Jan. 19, 2006, now U.S. Pat. No. 8,229,467. The disclosures of the above-listed applications are hereby incorporated herein by reference.

STATEMENT REGARDING FEDERALLY SPONSORED RESEARCH OR DEVELOPMENT

Not applicable.

BACKGROUND OF THE INVENTION

During recent years, the demand for detailed information, such as for example weather information, has risen sharply. Personal computers and communication devices have increased the demand for more information because of their power to gather, manipulate, transmit and receive data. As a result, specialized information and value-added services are in great demand. End users no longer desire to gather, manipulate and evaluate raw data. For instance, nowhere is this condition more apparent than with weather services across North America.

Years ago, radio and television broadcasters recognized an increasing demand for weather information from their audience, and thus increased the number of on-air weather segments as a means for increasing market ranking. Today, the demand for specific content in weather information has exceeded the ability of broadcasters to meet this demand. Virtually every facet of business and personal activities are continually influenced by the weather, good or bad.

In the United States as in most countries, a governmental agency (the National Weather Service in the United States), has the primary responsibility of generating weather products for the general public. These products, such as advisories, statements, and forecasts are generated and made available to third parties, such as broadcasters, newspapers, internet web sites, paging companies and others who, in turn, distribute them to the public. However, this chain of data custody is one way.

Today's lifestyles are fast-paced and sophisticated. Requests for detailed weather information for specific applications outnumber the governments' ability to process them. However, adhering to their mandated responsibility, the National Weather Service generates the general products for public consumption twice daily. This condition forces the public to interpret general and outdated advisories to meet their needs. Often, this interpretation is made erroneously. Even worse, these products are usually regional or national in scope, and may not apply to a particular location where various local activities are underway.

By way of example, weather warnings are broadcast by radio stations across the United States. These warnings identify certain weather impacts within a specified area. In most cases, the warning area includes one or more counties, covering dozens to hundreds of square miles. Most often, these threats (such as severe thunderstorms, tornadoes, etc.), only impact a very small zone within the warning area. These threats also move rapidly. As impacts approach specific zones, they are in fact, moving away from other zones, inside the total warning area. Essentially, the existing reporting system is insufficient to specifically identify and adequately warn of personal risk. Furthermore, if the threat is imminent, the existing system cannot and does not provide preventive measures for each user near or at the threat. Thus, by default, distant or unaffected users are placed "on alert" unnecessarily when the threat may be moving away from their location.

Another common example further clarifies the problem. A family, excited to attend the championship softball game this upcoming weekend, closely monitors the local weather forecast. All week-long the forecast has advised fair to partly cloudy weather for game day. Early on game day, the forecast changes to partly cloudy, with a thirty percent chance for late afternoon showers. The family decides to attend the game, believing that the chances for rain are below their perceived risk level. Unknown to the family at midday, some clusters of showers are intensifying, and will place dangerous lightning over the game field. While the morning weather report was not completely inaccurate, the participants and spectators are exposed to risk. If later asked, it is likely the family members did not hear or remember the weather forecast. They also failed to link their limited knowledge of the weather to their own needs and risk exposure. They did not monitor changing weather events. Most likely, they had no ability to monitor developing risk at the game. Clearly, these people were forced to interpret outdated, limited information as applied to their specific application.

Therefore, a need exists for a system to automatically and continuously provide consumer customized reports, advisories, alerts, forecasts and warnings relevant to a consumer-defined level of need or dynamic spatial location. It is to such a system that the present invention is directed.

SUMMARY OF THE INVENTION

The present invention provides an interactive advisory system and method of delivering individualized information. More specifically, the present invention relates to a broadcast network for selectively transmitting individualized output signals to remote communicator devices. The broadcast network includes a user input database, a communicator location database, an analysis unit and a communication network.

The user input database contains user-defined parameters and each of the user-defined parameters desirably includes a spatial range identifier and a user profile. The user profile in each of the user-defined parameters at least identifies a communicator device associated with a particular user. The communicator location database contains real-time data indicative of the spatial locations of the communicator devices. In one preferred version of the present invention, the communicator location database is automatically and/or continuously updated by the communicator devices.

The information database contains data, such as real-time weather data for at least the spatial locations contained in the communicator location database. The term "data" describes a wide variety of products including, but not limited to, past and current conditions of weather events, textual products, graphic products, and the like. The analysis unit receives the real-time data from the information database, and automatically and continuously compares the spatial range identifier included in the user-defined parameters and the spatial locations of the corresponding communicator devices contained in the communicator location database with the real-time data and, upon demand of, the user, or even continuously, generates an individualized output signal such as weather information within the spatial range identified by the spatial range identifier for the user-defined parameters. As new locations are defined by the communicator location database, the information database is automatically updated in real-time.

The communication network transmits each individualized output signal to the particular communicator device defined in the user profile included in the user-defined parameter corresponding with the real-time data and prediction of events. Thus, a user can receive information in real-time specific to the user's immediate spatial location regardless of whether or not the user's location remains fixed or dynamic throughout time.

In one embodiment, the present invention is used for locating at least one known or unknown individual located remotely from the broadcast network.

Other advantages and features of the present invention will become apparent to those skilled in the art when the following detailed description is read in view of the attached drawings and appended claims.

DETAILED DESCRIPTION OF THE INVENTION

Figure 1:
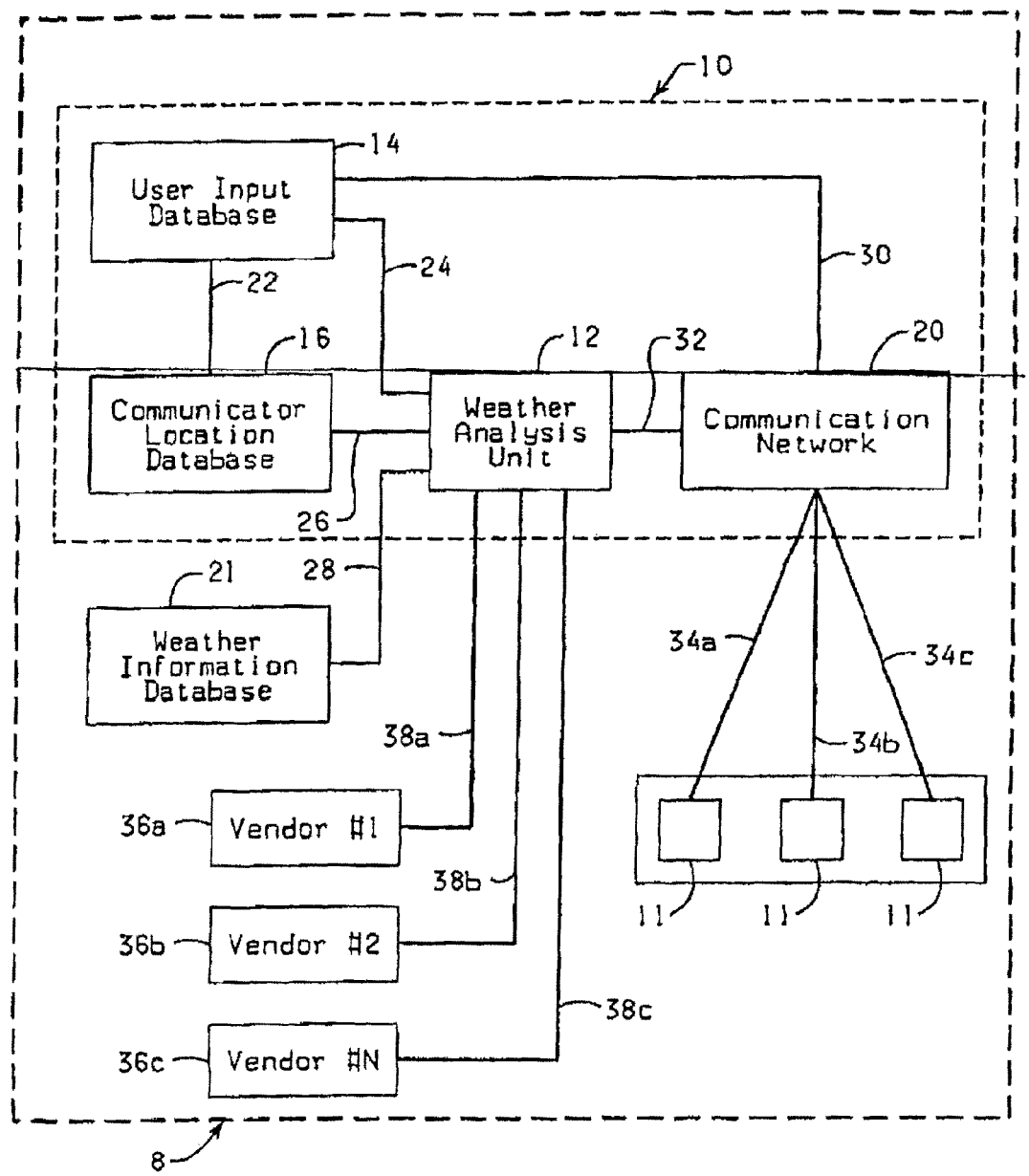
FIG. 1 is a block diagram of an interactive weather advisory system constructed in accordance with the present invention.

Referring now to the drawings and more particularly to FIG. 1 shown therein in block diagram form, is one embodiment of the invention in the form of an interactive weather advisory system constructed in accordance with the present invention. The weather advisory system 8 is provided with a broadcast network 10 for selectively transmitting individualized weather output signals to remote communicator devices 11. The broadcast network 10 includes a weather analysis unit 12, a user input database 14, a communicator location database 16, and a communication network 20. The weather analysis unit 12 receives real-time weather data from a weather information database 21. The weather information database 21 can be located at the broadcast network 10, or remotely from the broadcast network 10. The weather analysis unit 12, the user input database 14, the communicator location database 16, the weather information database 21, and the communication network 20, interrelate and communicate via signal paths 22, 24, 26, 28, 30 and 32.

The user input database 14 permits a plurality of users to input data corresponding to the weather reports, advisories or forecasts such that individualized weather reports, advisories or prediction of events can be transmitted to each individual user. The user input database 14 contains data representative of at least one user-defined parameter correlated to each one of a plurality of users. In one version of the present invention, each of the user-defined parameters includes various information related to weather output signals, such as a spatial range identifier, a user profile, one or more weather content identifiers for identifying particular weather patterns, one or more time identifiers for identifying particular times or time intervals that a user may desire a weather product, a spatial location fixed or dynamic code, and a spatial location identifier for identifying particular spatial locations of interest to the user if the spatial location fixed or dynamic code indicates that the spatial location is to be fixed. The user profile in each of the user-defined parameters includes at least a user identifier code for identifying a particular communicator device 11 associated with a particular user.

For instance, the user identifier code could be a mobile telephone number identifying one of the communicator devices 11, which in this instance could be a mobile telephone or a pager, for example. The weather content identifier could be a computer code to identify one or a variety of weather conditions or events such as tornadoes, thunderstorms, hail storms, lightning storms, showers, snow storms, blizzards, high winds, winds aloft, rapidly rising or rapidly falling barometric pressure or other such weather patterns or conditions. The time identifier desirably could be a computer code for identifying the particular time, times, or time intervals the user desires the interactive weather advisory system 8 to communicate weather data to the user or to monitor the real-time weather data for a particular time and/or date. The spatial location identifier 26 could be a computer code identifying a particular predetermined spatial location such as, by way of example but not limitation, a longitude and latitude anywhere in the world, a town, a county, a township, address, zip code, altitude and combinations thereof.

As discussed above, the spatial location identifier identifies a particular spatial location anywhere in the world and/or altitude above sea level. The spatial range identifier identifies a particular spatial range surrounding the spatial location identifier. Each of the users can select the spatial location identifier and the spatial range identifier so as to receive weather forecasts and/or weather advisories or any other weather information for the spatial location identified by the spatial location identifier, and within the spatial range identified by the spatial range identifier.

Figure 2:
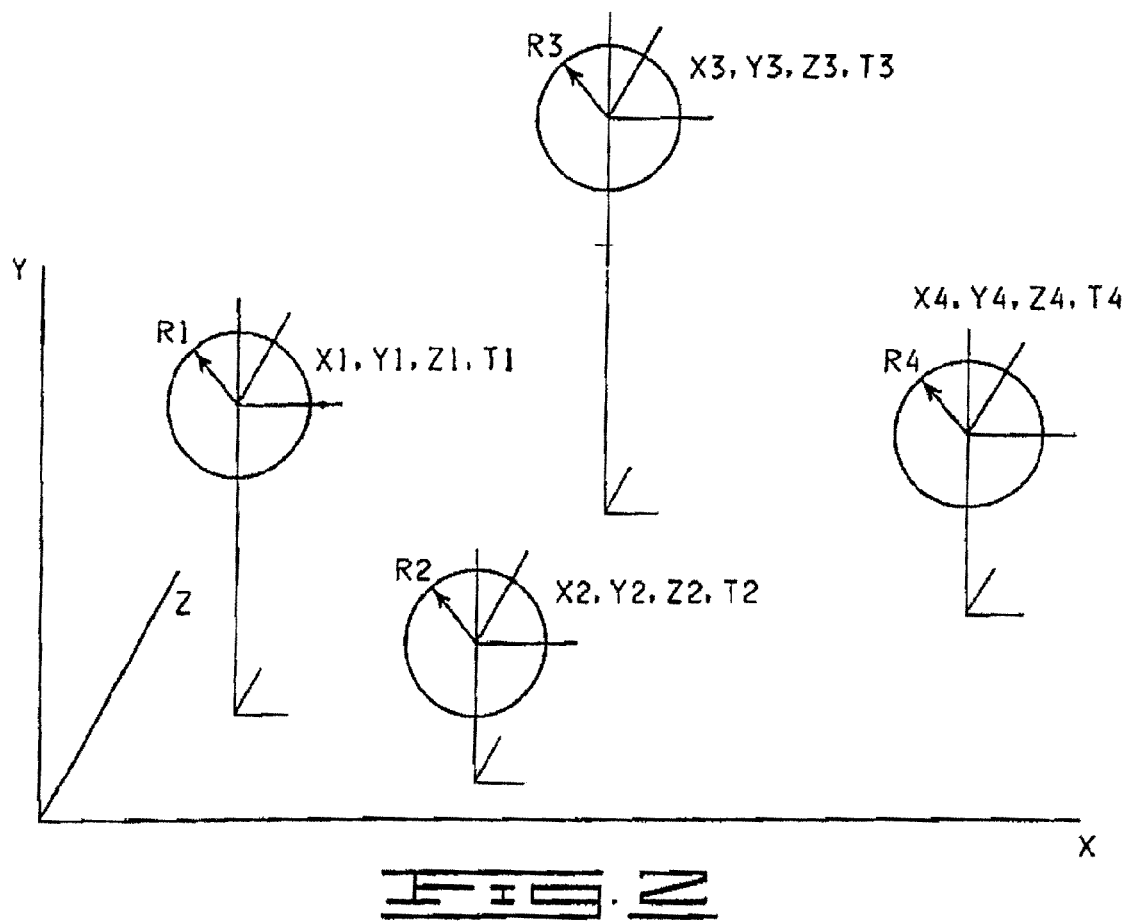
FIG. 2 is a coordinate system illustrating a spatial location identifier and a spatial range identifier utilized by versions of the present invention.

For example, referring to FIG. 2, shown therein is a coordinate system illustrating four spatial location identifiers and four spatial range identifiers selected by different users of the present invention. That is, one of the users selects the spatial location identifier (X1, Y1, Z1), and the spatial range identifier (R1). Another one of the users selects the spatial location identifier (X2, Y2, Z2), and the spatial range identifier (R2).

The user who selected the spatial location identifier (X1, Y1, Z1) and the spatial range identifier R1 will receive weather products and advisories concerning the spatial range identified by the spatial location identifier (X1, Y1, Z1) and the spatial range identifier R1, as predefined in his user input database. The user who selected the spatial location identifier (X2, Y2, Z2) and the spatial range identifier R2 will receive weather products and advisories concerning the spatial range identified by the spatial location identifier (X2, Y2, Z2) and the spatial range identifier R2, and as predefined in the user input database 14. Likewise, the users who selected the spatial location identifiers (X3, Y3, Z3) and (X4, Y4, Z4) and the spatial range identifiers R3 and R4 will receive weather products and advisories concerning the spatial range identified by the spatial location identifiers (X3, Y3, Z3), (X4, Y4, Z4) and the spatial range identifier R3, R4, and as predefined in the user input database 14.

The magnitudes of the spatial range identifiers R1, R2, R3 and R4 can be different or the same. In addition, the magnitudes of the spatial range identifiers R1, R2, R3 and R4 can vary widely and are desirably selected by the users.

Particular users can input the user-defined parameters into the user input database 14 via any suitable method. For example, the user input database 14 is desirably configured to acquire its data from a variety of optional sources preferably chosen by the user, such as verbally through a telephone customer service network, a mobile phone network equipped with wireless application protocol technology, email, a personal digital assistant, a laptop computer, or an interactive web site. Furthermore, users could mail the user-defined parameters to the broadcast network 10, and an individual at the broadcast network 10 could input the user-defined parameters directly into the user input database 14 via a keyboard or other similar input device. In one embodiment, the user inputs the selected information into the user input database 14 via the user's communicator device 11.

The weather information database 21 contains real-time weather data for at least the spatial locations contained in the communicator location database 16 and the spatial locations identified by the spatial location identifier in the user input database 14. The weather analysis unit 12 generates predictions of all weather events based on the real-time weather data. The weather information database 21 desirably receives its real-time weather data from at least one of a plurality of possible resources such as, by way of example but not limitation, government weather information resources, privately operated weather information resources, and other various meteorological resources. The real-time weather data could also be either input directly at the physical location of the weather information database 21 or input via a mobile phone network, a mobile phone network with wireless application protocol, the Internet, aircraft communication systems, email, a personal digital assistant, a laptop computer, regular computer, or other wireless devices.

Alternatively, the weather information database 21 may contain weather prediction data and/or weather forecast data for at least the spatial locations contained in the communicator location database 16 and the spatial locations identified by the spatial location identifier in the user input database 14. In this embodiment, the weather analysis unit 12 generates predictions of all weather events based on the real-time weather data.

The communicator location database 16 is an optional feature of the present invention, and is enabled via the signal path 22 when the user requests real-time weather advisories or prediction of events at the dynamic spatial location of the user's communicator device 11. The communicator location database 16 is continuously updated such that the communicator location database 16 contains real-time data indicative of the spatial locations of the communicator devices 11. In one embodiment, the user identifier code in the user's profile is transmitted to the communicator location database 16 via the signal path 22. The communicator location database 16 desirably receives data from the communicator devices 11 identified by the user identifier codes via at least one of a variety of possible resources such as a mobile phone network, a mobile phone network equipped with the wireless application protocol technology, global positioning satellite technology, the Internet, loran technology, radar technology, transponder technology or any other type of technology capable of tracking the spatial location of a communicator device 11 and communicating the location of such communicator device 11 to the communicator location database 16 of the broadcast network 10. Preferably, the communicator location database 16 is continuously and automatically updated as to the location of each of the communicator devices 11, such as by the wireless application protocol technology. Alternatively, the communicator location database 16 may be updated upon demand of a user as to the location of each of the communicator devices 11, such as by the wireless application protocol technology.

The communication network 20 can be, by way of example but not limitation, a mobile phone network, a mobile phone network with wireless application protocol technology, the Internet, a facsimile network, a satellite network (one or two-way), a RF radio network, or any other means of transmitting information from a source to an end user.

The communicator devices 11 can be bidirectional or unidirectional communicator devices. The communicator devices 11 can be, by way of example but not limitation, a portable device, such as a mobile telephone, a smart phone, a pager, a laptop computer or a personal digital assistant, or any other electronic device capable of receiving weather information data. Furthermore, the communicator device 11 can be incorporated into an object that is utilized or accessible by the user, such as a helmet, an automobile, or an airplane, for example. While only three communicator devices 11 are represented in FIG. 1 for purposes of illustration, the interactive weather advisory system 8 contemplates the utilization of a large number of communicator devices 11.

The weather analysis unit 12 receives the data in the user input database 14, the communicator location database 16, and the weather information database 21 from the signal paths 24, 26, and 28. The weather analysis unit 12 can be, by way of example but not limitation, a computer desirably programmed to automatically and continuously compare the data in the user input database 14, communicator location database 16, and weather information database 21 so as to generate an individualized weather output signal including weather information within the spatial range identified by the spatial range identifier for each user-defined parameter in the user input database 14. The weather output signals are transmitted to the communication network 20 via the signal path 32.

The weather analysis unit 12 gathers the real-time weather data from the weather information database 21. The term "real-time weather data", as used herein, refers to weather data which is continually updated so as to indicate current or near current information. In some instances, the "real-time weather data" may be delayed by relatively small increments of five minutes, 15 minutes, or 30 minutes, for example. In other instances, the "real-time weather data" can be provided with substantially no delay. It is expected that the increments will become smaller as communication networks and weather related technology become faster.

The weather analysis unit 12 generates predictions of all weather related events and compares past and current events contained in the weather information database 21 (such as future position, strength, trajectory, etc.), to construct a four-dimensional database. Three dimensions of the database define a physical location on or above the earth's surface (the spatial location identifier (X1, Y1, Z1). The fourth dimension is time—past, present or future (identified as T1, T2, T3, T4). By employing high speed computer processors in real-time, the weather analysis unit 12 compares all events (past, current and predicted), at specific positions (X1, Y1, Z1, T1) with identical user supplied data (the user input database—X1, Y1, Z1, R1, T1), and identifies any matches (weather output signals) to the user through the communication network 20 and communication devices 11.

The communication network 20 receives the weather output signals and the user identification codes via the signal paths 32 and 30. In response thereto, the communication network 20 transmits the individualized weather output signals to the communicator devices 11 associated with the user identification codes via the signal paths 34a, 34b and 34c, such that each user receives the individualized weather information that was requested.

The signal paths 34a, 34b and 34c refer to any suitable communication link which permits electronic communications. For example, the signal paths 34a, 34b and 34c can be point-to-point shared and dedicated communications, infra red links, microwave links, telephone links, CAN links, satellite and radio links and fiber optic links.

Various combinations of weather information can be incorporated into the user input database 14 so as to provide the user with selected and specific weather information. For example, a user traveling in his automobile may wish to be informed by the interactive weather advisory system 8 concerning all hailstorms for an area within a 2.5 mile radius of his vehicle as he is traveling from his point of origin to his destination. The user, for example, through his smart phone (communicator device 11) in his vehicle working in conjunction with a mobile phone network (communication network 20) with wireless application protocol, inputs selected information into the user input database 14; namely, the user's smart phone number (user identifier code), hail (weather content identifier), 2.5 mile radius (spatial range identifier 24) and spatial location dynamic (spatial location of the user's smart phone is then automatically and continuously monitored), and the like.

The interactive weather advisory system 8 then monitors weather information and predictions of events in the weather analysis unit 12, and transmits the individualized weather output signal to the user's smart phone if a hailstorm is detected or is highly likely to form within a 2.5 mile radius of the vehicle along the vehicle's path of travel, for the duration of travel.

The individualized weather output signal can be an audio, video, textural and/or graphical data signal. For example, the individualized weather output signal can be a .WAV file or other suitable file containing an animated representation of a real or hypothetical individual speaking an individualized message to the user. In the example given above, the individualized message may be that the hailstorm is 2.5 miles ahead of the vehicle and thus, the user should consider stopping for a short period of time so as to avoid the hailstorm. Alternatively, the individualized message may be that the hailstorm is 2.5 miles ahead of the vehicle and thus, the user should consider stopping until further notified by another individualized weather output signal so as to avoid the hailstorm. In other words, the weather analysis unit 12 may transmit another individualized weather output signal to the user via the communication network 20 and the communicator devices 11 notifying the user that the weather condition identified by the weather content identifier has passed or is beyond the spatial location identified by the spatial range identifier.

As another example, a user may desire to be informed of all real-time weather data and predictions of events within a particular spatial range of a particular dynamic spatial location. For instance, the user may be interested in whether his aircraft is at risk of icing as he flies from Oklahoma City to Tulsa, Okla. To provide a suitable level of comfort and safety, the user may wish to be informed of icing conditions within 10 miles of the dynamic spatial location of his aircraft. The user, for example, through his smart phone or other suitable avionic device (communicator device 11) in his aircraft working in conjunction with a mobile phone network (communication network 20) with wireless application protocol, inputs selected information into the user input database 14; namely, the user's smart phone number (user identifier code), icing (weather content identifier), 10 mile radius (spatial range identifier 24), and the spatial location dynamic. The spatial location of the user's smart phone or other suitable avionic device is then automatically and continuously monitored as the aircraft traverses through time and space from (X1, Y1, Z1, T1) to (X4, Y4, Z4, T4). The interactive weather analysis unit 12 then monitors the real-time weather data in the weather information database 21 and the predicted events in the weather analysis unit 12 so as to transmit the individualized weather output signal to the user's smart phone or other avionic device identifying, if icing is detected or is highly likely to form relevant to a 10 mile radius of the aircraft.

As yet another example, perhaps the user is only interested in a particular weather pattern at a particular fixed spatial location and within a particular spatial range irrespective of the immediate location of the communicator device 11. To accomplish this user's request, the broadcast network 10 does not utilize the communicator location database 16. The user inputs selected information into the user input database 14, namely the user's phone number (user identifier code), the code for the particular weather pattern in which the user is interested (weather content identifier), the spatial range around the spatial location in which the user is interested (spatial range identifier), and the spatial location in which the user is interested (spatial location identifier). The weather analysis unit 12 then monitors the real-time weather data in the weather information database 21 and the predicted events in the weather analysis unit 12 so as to transmit the individualized weather information concerning the weather pattern in the spatial location and range requested by the user.

As a further example, perhaps the user is only interested in a particular weather condition at the spatial location and within a particular spatial range at a particular time. The user inputs selected information into the user input database 14, namely, the user's phone number (user identifier code), the code for the particular weather pattern in which the user is interested (weather content identifier), the spatial range around the spatial location in which the user is interested (spatial range identifier and the spatial location in which the user is interested spatial location identifier) and the time and date (time identifier) that the user to wishes to be informed of the weather conditions at the spatial location of interest. In response thereto, the weather analysis unit 12 monitors the real time weather data from the weather information database 21 for the spatial location and range identified by the spatial range identifier and spatial location identifier to determine the probability of the particular weather pattern occurring at the time identified by the time identifier. The weather analysis unit 12 sends, via the signal path 32, the individualized weather output signal to the communication network 20. The communication network 20 receives the user identifier code, via signal path 30, from the user input database 14 and transmits the weather output signal received from the weather analysis unit 12 to the particular communicator device 11 identified by the user identifier code. Thus, the user receives the individualized weather information concerning the spatial location, spatial range and time requested by the user.

The signal paths 22, 24, 26, 28, 30 and 32 can be logical and/or physical links between various software and/or hardware utilized to implement the present invention. It should be understood that each of the signal paths 22, 24, 26, 28, 30 and 32 are shown and described separately herein for the sole purpose of clearly illustrating the information and logic being communicated between the individual components of the present invention. In operation, the signal paths may not be separate signal paths but may be a single signal path. In addition, the various information does not necessarily have to flow between the components of the present invention in the manner shown in FIG. 1. For example, although FIG. 1 illustrates the user identifier code being transmitted directly from the user input database 14 to the communication network 20 via the signal path 30, the user identifier code can be communicated to the weather analysis unit 12 via the signal path 24 and then communicated to the communication network 20 via the signal path 32.

It should be understood that although the user has been described as manually inputting the user identifier code into the user input database 14, the user identifier code could be automatically input into the user input database 14 by the communicator device 11.

Once the user-defined parameters have been input into the user input database 14, the user-defined parameters can be analyzed by the weather analysis unit 12 along with weather content identifiers for purposes of targeted marketing. A plurality of vendors 36 can be provided access to the weather analysis unit 12 of the broadcast network 10 via a plurality of signal paths 38a, 38b, and 38c. The vendors 36 can independently input search information into the weather analysis unit 12 for compiling a data set of information which is useful to the vendors 36.

For example, a particular vendor 36a, who is in the business of selling snow blowers, may input a weather content identifier and time identifier into the weather analysis unit 12 so as to request a list of all spatial locations in the United States which are expected to receive at least 10 inches of snow in the next week. The weather analysis unit 12 would then compile the data set of all spatial locations in the United States which is expected to receive at least 10 inches of snow in the next week based on at least one weather content identifier, the time identifier, and the real-time weather data stored in the weather information database 21. The data set is then output to the vendor 36a. Based on the data set, the vendor 36a may send advertisements or additional snow blowers to the areas identified in the data set.

As another example, the particular vendor 36a, who is in the business of selling snow blowers, may input a weather content identifier and time identifier into the weather analysis unit 12 so as to request a list of all user profiles identifying users who resided in spatial locations in the United States which are expected to receive at least 10 inches of snow in the next week. The weather analysis unit 12 would then compile the data set of all spatial locations in United States which is expected to receive at least 10 inches of snow in the next week based on at least one weather content identifier, the time identifier, the user profiles, and the real-time weather data stored in the weather information database 21. The data set is then output to the vendor 36a. Based on the data set, the vendor 36a may send advertisements to the users who are identified in the data set.

It is envisioned that users will subscribe to the services provided by the broadcast network 10. In this regard, the broadcast network 10 may or may not charge a service fee to the users. In addition, some services may be provided by the broadcast network 10 for one charge and additional services may be provided at an enhanced charge.

To save processing power, the weather analysis unit 12 may periodically determine which communicator devices 11 are turned off or out of range. Once this has been determined, the weather analysis unit 12 would then not generate any individualized weather output signals for the communicator devices 11 which are turned off or out of range. Once a particular one of the communicator devices 11 is turned on or comes within range, the weather analysis unit 12 would then attempt to generate individualized weather output signals for such communicator devices 11. In other words, to save processing power the weather analysis unit 12 may only generate individualized weather output signals for the communicator devices 11 which are active and within range.

The weather analysis unit 12 can be located at the broadcast network 10. Alternatively, the weather analysis unit 12 can be separate from the remainder of the broadcast network 10 and provided as a service to the broadcast network 10.

In one preferred embodiment, rather than or in addition to the user providing user-defined parameters to the user input database 14, the user input database 14 is programmed to provide a plurality of pre-defined user profiles with each of the pre-defined user profiles directed to an activity designated by the user optionally including data and time of the activity. The activity can be a business, personal or recreational need. For example, the business need can be any work dependent upon or impacted by weather conditions to carry out a desired activity, such as, but not limited to a rancher, contractor, farmer, or painter. The personal need can be any activity positively or negatively impacted by weather conditions, such as but not limited to, duties performed by a homeowner, such as mowing the lawn, painting the house, trimming trees, or the like. The recreational need can be any recreational or other outdoor activity dependent upon weather conditions, such as but not limited to golfing, cycling, boating, hiking, fishing, or snow skiing.

In this case, the user selects or provides an activity or category to the user input database 14. The user input database 14 retrieves pre-defined information concerning such activity or category and stores or links such pre-defined information with the user's user profile. The broadcast network 10 and/or weather analysis unit 12 then functions as set forth above to provide weather alerts or other information concerning the information contained in the user's user profile.

For example, a user may plan on golfing on a particular weekend during the hours of 9:00 a.m. to 4:00 p.m. In this case, the user would select the pre-defined user profile for "golfing", and the time frame of such planned activity. The location of planned activity can also be entered into the user input database 14, or the location of the communicator device 11 can be monitored by the communicator location database 16. The information contained in the pre-defined user profile is input into the user input database 14 and output weather alerts and forecasts are then generated as discussed above.

The pre-defined user profiles are determined by member(s) of the broadcast network 10 and/or weather analysis unit 12, who identify weather conditions which are typically suitable and/or adverse to each designated activity. Thus, for example, a pre-defined user profile for "golfing" will contain data such as wind conditions, lightning, rain, temperature and other conditions which will positively or negatively impact a golfing activity. The data in the pre-defined user profile can be determined either before or after selection of the activity by the user.

If desired by the user, the broadcast network 10 and/or weather analysis unit 12 can assume the responsibility for generating the appropriate size of the spatial range identifier (as in the case with the user profile, or pre-defined user profile). Alternatively, the spatial range identifier can be determined by the nature of the weather event. In the latter case, member(s) of the broadcast network 10 and/or weather analysis unit 12 would determine an "area of concern" around each weather event that would or could occur and the communication network 20 would then send notifications to any user or communicator device 11 that may come into contact with the area of concern.

For example, a tornado may be Y2 mile wide and the broadcast network 10 and/or weather analysis unit 12 would, based upon its experience, knowledge and/or abilities, determine that the area of concern would be 1½ miles wide and 8 miles long—moving northeasterly. Any user contained within the user input database 14 would be notified, as discussed above, if the user's location comes into contact with the "area of concern".

Other Uses of this System

Figure 3:
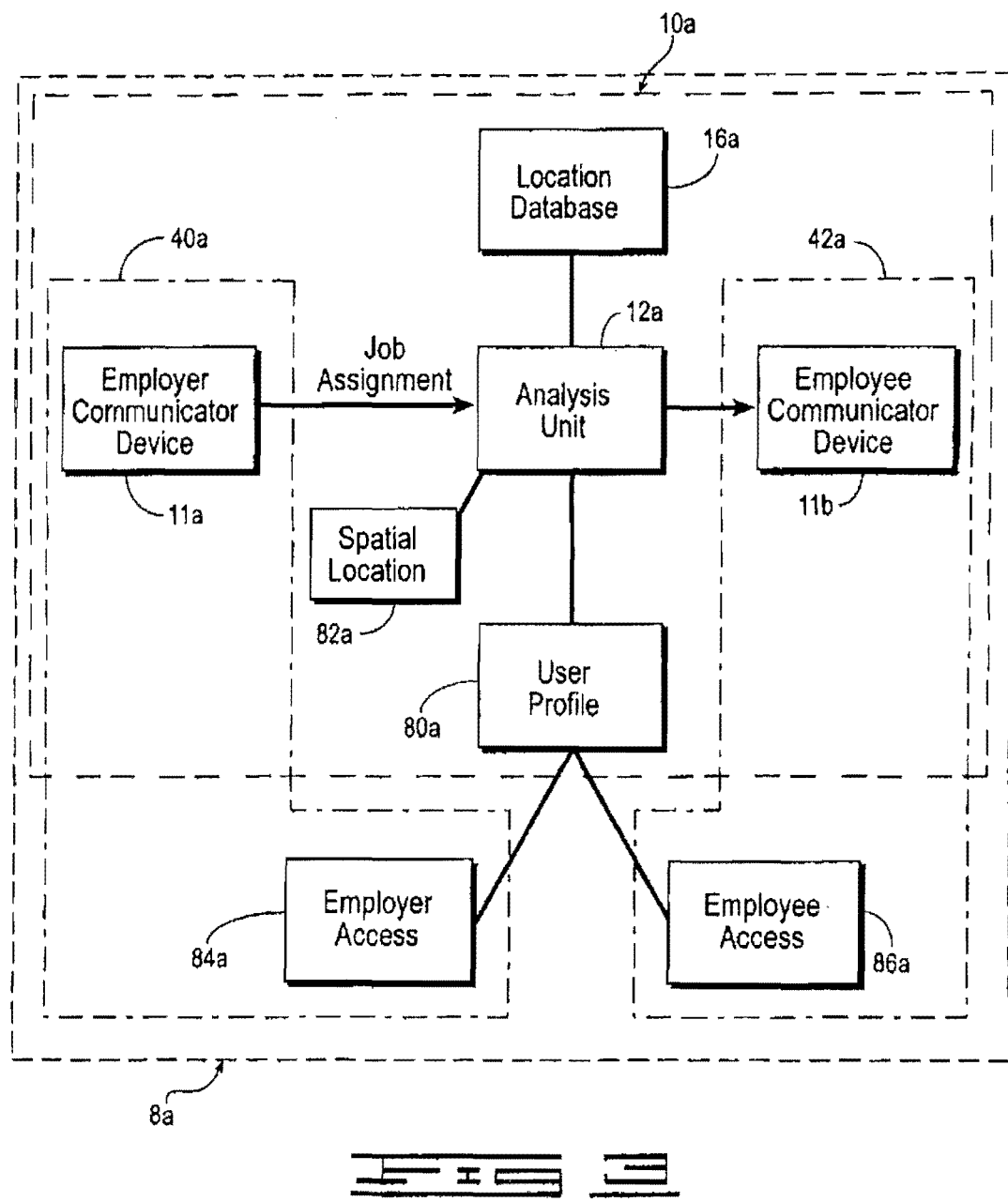
FIG. 3 is a block diagram of an interactive advisory system constructed in accordance with the present invention.
Figure 4:
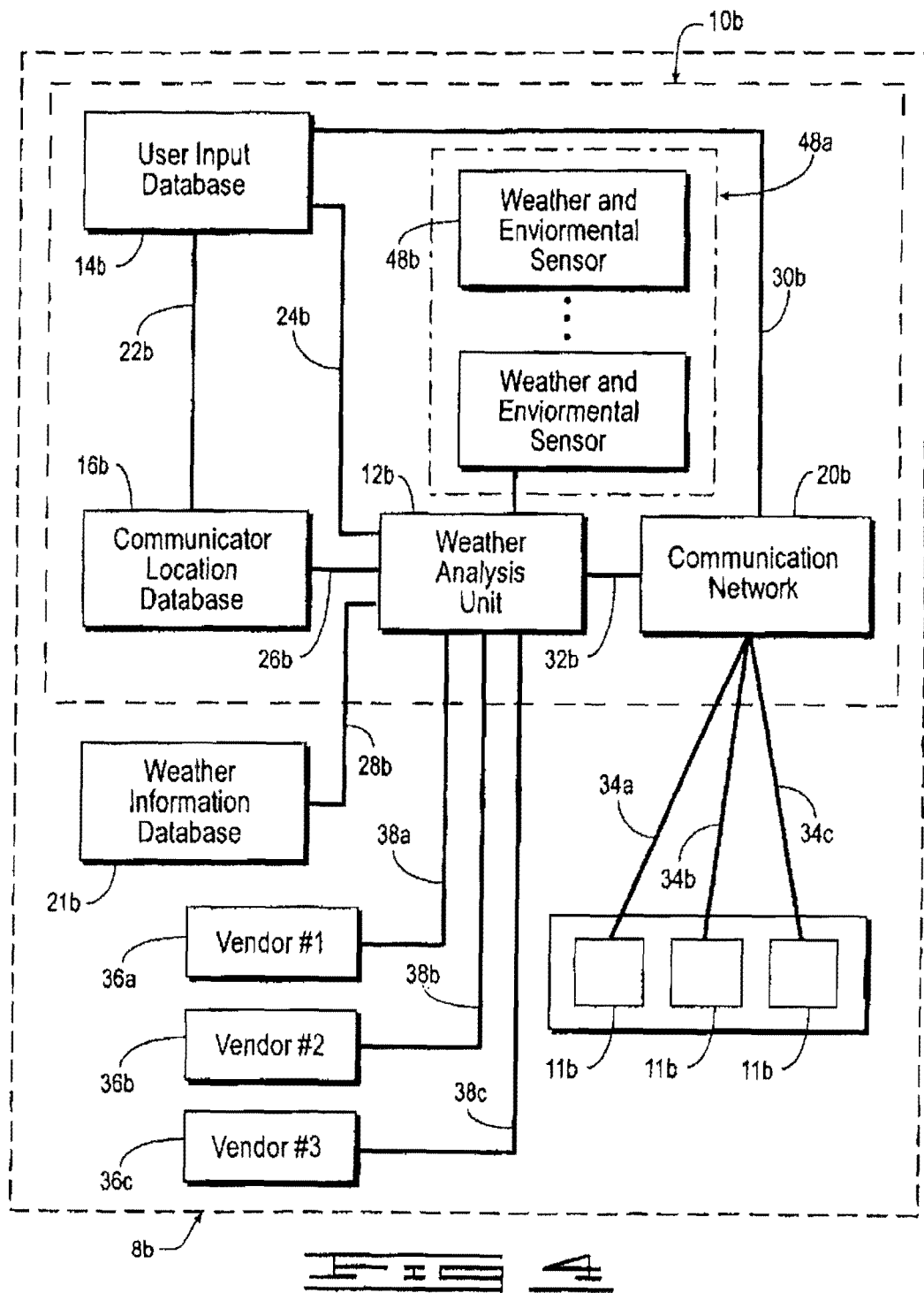
FIG. 4 is a block diagram of an interactive weather advisory system constructed in accordance with the present invention.

Shown in FIGS. 3-4, are advisory systems 8a and 8b which can be used for delivering other types of information or for more accurately predicting weather related events. The advisory systems 8a and 8b are similar in construction and function to the weather advisory system 8, except as described below. For purposes of clarity, similar components have been provided with the same numeric prefix, and different alphabetic suffix.

The advisory system 8a is provided with a broadcast network 10a. In one embodiment, the broadcast network 10a is used for transmitting individualized real-time work assignments from, for example, an employer to an employee. The broadcast network 10a is provided with an analysis unit 12a, a communicator location database 16a, and communicator devices 11a and 11b. The communicator device 11a is referred to herein as an "employer communicator device", and the communicator device 11b is referred to herein as an "employee communicator device." The communicator location database 16a is continuously updated to contain real-time data indicative of the spatial locations of the communicator devices 11a and 11b. In a similar manner as described above, the analysis unit 12a makes comparisons between user profiles (as represented by a box 80a), dynamic locations stored in the communicator location database 16a, fixed locations as represented by a box 82a and job assignments entered into the analysis unit 12a from one of the employer communicator devices 11a. The system 8a may be further described as an employer system 40a and an employee system 42a to delineate the types of information being conveyed within the system 8a.

For example, an employer uses the employer communicator device 11a to input employee information and/or criteria into an employee's user profile such as, for example, job location, job schedule, skill set requirements, personality traits, and other criteria as represented by a box 84a. Further, the employer inputs work or job assignment criteria into the analysis unit 12a such as, for example, job location, job schedule, skill set requirements, personality traits, and other criteria. The employer inputs the above criteria into one of the employer communicator devices 11a which may be, for example, a computer, a personal digital assistant (PDA), a cellular phone, a combination cellular phone/PDA, or any other device which may then transmit the employee information and/or job assignment criteria to the analysis unit 12a. The analysis unit 12a may be, for example, a computer or a web server. The analysis unit 12a matches the employee user profile criteria with the work assignment criteria to generate a data set of at least one individualized work assignment.

The individualized real-time work assignment is transmitted to one of the employee communicator devices 11b based upon the matching of the work assignment criteria with the employee user-profile. The data set can be transmitted to the employer communicator device 11a such that the employer can review the data set to assign the work assignment to a particular one of the employees, or alternatively, the analysis unit 12a can automatically assign the work assignment to a particular one of the employees and thereby transmit the work assignment to the employee's communicator device 11b without any intervention by the employer. The employee's communicator device 11b may be, for example, a PDA, a cellular phone, a combination cellular phone/PDA, a pager, or any other device in which the analysis unit 12a or the employer may communicate information to the employee.

The user profile for each of the employees includes information relating to the employee's traits such as, for example, personality, sales style, dress, skill set, location, schedule, or any other quality or trait relating to the particular employee. Further, the user profile is preferably accessible by both the employer communicator device 11a and the employee communicator device 11b. However, it is preferred that the employer communicator device 11a have access to the entire user profile, while the employee communicator device 11b only have access to a subset of the user profile. Thus, the user profile accessible by the employer system 40a may differ from the user profile accessible by the employee system 42a.

For example, the user profile accessible by the employer system 40a may include traits related to a particular employee that remain hidden or unknown to the employee. For instance, the employee may have access to information stored in his user profile such as location, schedule, skill set, and other criteria as represented by a box 86a and may be provided access to his user-profile to update information as needed. In addition to the above-mentioned employee-accessible information, the employer may have access to the employee user profile to input and access employee traits such as personality, sales style, dress, and skill set and may be provided access to update this information as needed.

In another embodiment, the system 8a is used to deliver goods based upon real-time location of a carrier of the goods. More specifically, the system 8a can be used to accommodate purchasers of products ordered online in order to quickly and efficiently deliver goods to the purchaser's specified location.

The analysis unit 12a is loaded with employee user profiles and locations. The analysis unit 12a identifies delivery persons (employees) located near a purchaser's location. Part of the employee's user profile can include an inventory of the goods on the employee's delivery truck. The employee need not know what inventory is located on his delivery truck, but only his delivery destination.

For example, a purchaser may order fresh produce online. The employer may input the purchaser's order (work assignment) into the employer communicator device 11a (which inputs the work assignment into the analysis unit 12a) so that the analysis unit 12a may determine which delivery person may efficiently deliver the specified goods to the purchaser. Also, by ordering online, the purchaser may send his order directly to the analysis unit 12a such that the analysis unit 12a automatically determines the appropriate delivery person to deliver goods to the purchaser and sends the assignment to the delivery person via the employee's communicator device 11b. Further, the employer updates the user profile to track and monitor the precise inventory located on the employee's delivery truck, the inventory being delivered, and any inventory that may be stolen from the delivery truck.

In yet another embodiment, the system 8a can be used for sending salesmen to the field for soliciting new clients. For example, a company may receive an inquiry from a sales lead. Information about the lead is entered into the analysis unit 12a as a job assignment from the employer communicator device 11a. The analysis unit 12a then determines the appropriate salesman to send to the lead based on information stored in the salesman's user-profile. The salesman's user-profile may include information such as salesman location, personality traits, dress style or other attributes used to determine which salesman may be appropriate to send to the lead.

Shown in FIG. 4 is another advisory system 8b constructed in accordance with the present invention. The advisory system 8b includes a broadcast network 10b. The broadcast network 10b is similar in construction and function as the broadcast network 10 discussed above, except that the broadcast network 10b includes individualized sensor networks 48a having weather and environmental sensors 48b which are specifically associated with geographic areas associated with predetermined users.

For example, the weather and environmental data collection sites are tremendously sparse in growing areas of the world. In the state of Iowa, only a minimal number of National Weather Service data collection points exist. The scarcity of weather data hinders farmers because a dense grid of weather data points is non-existent in order for farmers to make critical decisions about their crops. For example, how do you know what 160-acre tract of land to fertilize when soil temperature data, crop moisture data, and chance of precipitation data is unavailable?

The sensor network 48a includes temporary or permanent data collection sensors 48b which may be installed, for example, on a 10 acre to 40 acre grid on the land of a subscriber or user of the system 8b. Each sensor 48b may have a unique spatial range associated with it such as, for example, a five mile or twenty mile radius. The spatial range associated with each sensor 48b can be selected by the user and specified as a result of the sensor 48b type and purpose as well as the density of the sensor network 48a. For example, if the user is interested in soil moisture in order to schedule a fertilizer treatment, the spatial range associated with the chosen sensor 48b may be set, for example, at 375 feet. In another example, the user may be interested in soil temperature for placing seeds in the ground and the desired spatial range associated with the chosen sensor 48b may be, for example, 2,000 feet. The user of the system 8b includes a user profile as discussed above, which is supplemented with information regarding the sensors 48b associated with the user, e.g., installed on or near the user's land. The sensors 48b transmit site-specific, individualized information to the weather analysis unit 12b so that more detailed information can be used by the weather analysis unit 12b in generating the site-specific weather information for the user.

The sensors 48b can be any type of sensor which generates information usable for forecasting weather, transmitting current weather conditions, transmitting current environmental conditions, and/or forecasting environmental conditions. For example, the sensors 48b can be used to sample or record such parameters as, but not limited to, air temperature, humidity, precipitation, solar radiation, wind speed and direction, soil temperature, soil moisture, and/or chemical constituents in the soil.

For example, a user may enter into his user profile types of information the user would like the sensor network 48a to monitor such as, for example, temperature, moisture and/or soil conditions. The weather analysis unit 12b receives the sensor data from the sensor network 48a and transmits information to the user via the user's communicator device 50b based on information entered into his user profile. The user may also choose a specific sensor for monitoring a specific area at any given time by modifying his user profile.

Further, the system 8b may be used to transmit real-time road condition information to the weather analysis unit 12b to enhance the weather information transmitted to the users of the system 8b. Although the sensors 48b can include their own power source such as a battery or solar power source, the sensors 48b are preferably positioned on a device which has its own electrical power source. For example, a temporary or permanent sensor or sensors 48b may be placed in various locations along a roadway such as on a vehicle, on or beside the roadway, on a billboard, gas pump, cell phone tower or sign alongside the roadway or railway, on a delivery vehicle(s) such as, for example, UPS and/or FedEx, or on the streetlights. If the sensor 48b is placed on the roadway, it may be placed in the concrete or asphalt. If placed beside the roadway, the sensor 48b may be placed in, for example, a ditch. The sensor(s) 48b may detect, for example, moisture, temperature or any other weather or environmental condition associated with the roadway, sign alongside the roadway, on streetlights, or on delivery vehicles such as, for example, UPS and/or FedEx, or on railway cars. Alternatively, the sensor(s) 48b may be used to detect traffic conditions or any other condition associated with a particular roadway or railway.

For example, each sensor 48b may be placed 100 feet away from the nearest sensor in order to create the sensor network 48a for determining conditions for a specified area along a roadway or railway. Further, the sensor(s) 48b may be placed on various cellular phone towers so that users of a particular cellular phone system associated with the tower may access various conditions using the system 8b.

Each of the weather sensors 48a can also include a system such as a GPS system for determining the current location of such weather sensor so that the current location of the weather sensor is transmitted to the weather analysis unit 12b.

One skilled in the art will recognize many uses of the system 8b. For example, when sensor data is collected by sensors 48a positioned on moving vehicles along roadways or railways, the weather analysis unit 12b can transmit such weather information to communicator devices 11b located in close proximity to where the sensor data is being collected. Thus, assuming that a Federal Express truck is located five miles from a subscriber, the information collected from the sensor on the Federal Express truck can be transmitted to the subscriber.

Figure 5:
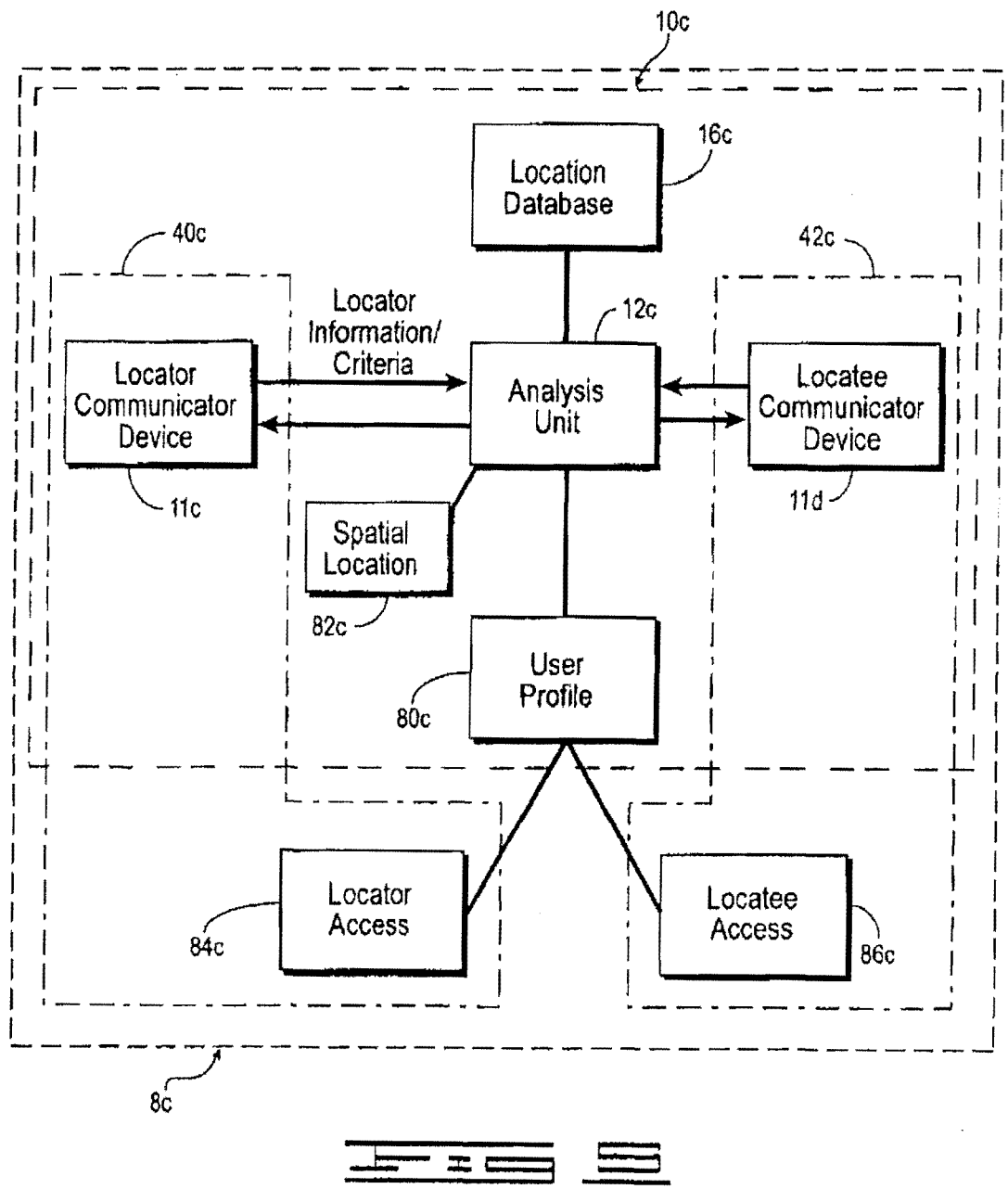
FIG. 5 is a block diagram of an interactive advisory system constructed in accordance with the present invention.

Shown in FIG. 5, is an advisory system 8c which can be used for delivering other types of information. The advisory system 8c is similar in construction and function to the advisory system 8a, except as described below. For purposes of clarity, similar components have been provided with the same numeric prefix, and different alphabetic suffix.

The advisory system 8c is provided with a broadcast network 10c. In one embodiment, the broadcast network 10c is used for locating at least one known or unknown individual located remotely from the broadcast network 10c. The broadcast network 10c is provided with an analysis unit 12c, a communicator location database 16c, and at least one communicator device 11c and preferably at least two communicator devices 11c and 11d. The communicator device 11c is referred to herein as a "locator communicator device", and the communicator device 11d is referred to herein as a "locatee communicator device." The term "locator" as used herein shall mean a person trying to locate a locatee. The term "locatee" as used herein shall mean a person to be located. The communicator location database 16c is continuously updated to contain real-time data indicative of the spatial locations of the locator communicator device 11c and the locatee communicator device 11d.

In a similar manner as described above, the analysis unit 12c makes comparisons between user profiles (including information indicative of unique personal traits) entered into the analysis unit 12c from one of the remote communicator devices 11c and 11d (as represented by a box 80c), dynamic locations stored in the communicator location database 16c, and fixed locations as represented by a box 82c. The system 8c may be further described as a locator system 40c and a locatee system 42c to delineate the types of information being conveyed within the system 8c.

For example, a locator utilizes the locator communicator device 11c to input his or her locator information and/or criteria into his or her user profile such as, for example, personal characteristics (i.e., height, weight, age, eye color, hair color, gender, race, occupation and the like) personality traits (i.e., outgoing, social drinker, non-smoker, and the like), a photograph, an audio presentation by the locator, a video presentation of and/or by the locator, an audio/video presentation of and/or by the locator, and other user information and/or criteria as represented by a box 84c. Additionally or alternatively, the locator inputs desired criteria of a locatee into the analysis unit 12c such as, for example, personal characteristics, personality traits, proximity (including a spatial range identifier indicating a distance from the locator's fixed or dynamic location), or any other criteria. The locator inputs the above criteria into one of the locator communicator devices 11c which may be, for example, a computer, a personal digital assistant (PDA), a cellular phone, a combination cellular phone/PDA, or any other device which may then transmit the locator criteria to the analysis unit 12c. The analysis unit 12c may be, for example, a computer or a web server. The analysis unit 12c matches the locatee user profile criteria with the locator user profile criteria and/or locator desired criteria to generate a data set of locatee user profiles that match the locator criteria.

The locator criteria is transmitted to one of the locatee communicator devices 11d based upon the matching of the locator criteria with the locatee user-profile. The permission of the locatee may be obtained prior to forwarding any information about the locatee to the locator communicator device 11c, if desired. Once the locatee's permission is received (if required), the data set can be transmitted to the locator communicator device 11c such that the locator can review the data set to determine a locatee to contact by text message or any other means of communication, or alternatively, the analysis unit 12c can automatically determine a locatee to contact and thereby transmit the text message or other means of communication to the locatee's communicator device 11d without any intervention by the locator. The locatee's communicator device 11d may be, for example, a PDA, a cellular phone, a combination cellular phone/PDA, a pager, or any other device in which the analysis unit 12c or the locator may communicate information to the locatee.

The user profile for each of the locatees includes information relating to the locatee's personal characteristics such as, for example, height, weight, age, eye color, hair color, gender, race, occupation and the like and/or personality traits such as, for example, outgoing, social drinker, non-smoker, and the like, or any other quality or trait relating to the particular locatee. The locatee's user profile may additionally include a photograph of the locatee, an audio presentation by the locatee, a video presentation of and/or by the locatee, an audio/video presentation of and/or by the locatee, and other user information and/or criteria as represented by a box 86c.

Once the locatee's user profile is downloaded to a locator's communicator device 11c, the locator may add additional information relating to the locatee such as the locator's impression or opinion of the locatee or any other information the locator considers relevant to the locatee. This additional information remains hidden from the locatee, however, may be broadcast to additional users of the advisory system 8c. For example, the user profile accessible by the locator system 40c may include traits related to a particular locatee that remain hidden or unknown to the locatee as represented by the box 86c. For instance, the locatee may have access to information stored in his user profile such as inputted personal characteristics and/or personality criteria as represented by the box 86c and may be provided access to his user-profile to update information as needed. In addition to the above-mentioned locatee-accessible information, the locator may have access to the locatee user profile to access locatee traits such as personal characteristics and/or personality traits.

For example, a locator may include in his user profile that he is single, white, male, age 26, college student, non-smoker, and a light social drinker. The locator desires to locate white, single, females that share the same personal characteristics and/or personality traits. The locator may download the user profiles entered by other users ("locatees") of the advisory system Sc. The locator may send the locatee a text message or other means of communication to make further contact with the locatee. In this embodiment, the present invention may be considered a flirt-service, dating service, or match-making service.

In another embodiment, the system 8c is used to locate and provide entertainment among users with similar user profiles. Examples of such users include movie goers, garners, or other persons interested in a particular segment of the entertainment industry. More specifically, the system Sc can be used to locate individuals having similar interests in the entertainment industry and provide desired entertainment for such individuals. The system Sc can be used to locate individuals relative to a designated spatial range inputted into the analysis unit 12c by the locator. Alternatively, the system Sc can be used to locate individuals/locatees regardless of the locatee's location.

In the same manner as described above, the locator utilizes the locator communicator device 11c to input his or her locator information and/or criteria into his or her user profile such as, for example, entertainment interests, desired and/or designated spatial range (based upon a fixed or dynamic location), and other user information and/or criteria as represented by the box 84c. Additionally or alternatively, the locator inputs desired criteria of a locatee into the analysis unit 12c such as, for example, entertainment interests, desired and/or designated spatial range, and any other criteria desired by the user. The analysis unit 12c matches the locator information with the locatee information in the same manner as described above to locate and match other users of the system 8c having similar interests in the entertainment industry and/or a proximity within the area designated by the locator.

For example, a locator wishing to play a game such as, for example, tag, with other users of the system 8c may input his locator user profile information into the analysis unit 12c via his locator communicator device 11c in the same manner as described above. Examples of such locator user profile information include, for example, personal characteristics and/or personality traits, and/or a desired spatial range for locating locatees. In addition, the locator may input desired criteria of the locatee into the analysis unit 12c such as, for example, desired personal characteristics and/or personality traits, desired locatee location, and/or a desired spatial range for locating locatees.

A locator wishing to play a game of tag, for example, inputs information (via the locator communicator device 11c) relating to the type of game, the locator's personality traits and/or personal characteristics, into the analysis unit 12c and designates his desire to locate locatees within a spatial range of, e.g., 50 miles from his location. Using the world as a "gameboard" for participating in the designated game of tag, the analysis unit 12c matches the locatee user profile criteria with the locator user profile criteria and/or locator desired criteria to generate a data set of locatee user profiles that match the locator criteria.

Based upon this data set of locatees, the locator may choose locatees/participants to participate in the designated game and send a message such as, for example, a text message, via his locator communicator device 11c such as "Tag, you're it" to the designated locatee via the locatee communicator device 11d. Alternatively, the system 8c can automatically determine a locatee to contact and thereby transmit the text message or other means of communication to the locatee's communicator device 11d without any intervention by the locator.

In addition to locating and matching users having similar interests in the entertainment industry, the system 8c is used by users/garners to play or participate in a game such as, for example, a video game and the like, and/or interact with other users/gamers to play a desired or designated game. In the same manner as described above, the system 8c allows the user to interact with another individual/user involved in the game based upon the location (static or dynamic) of each user involved in a particular game (including a spatial range identifier indicating a distance from a user's fixed or dynamic location).

Additionally, the locator may use the system Sc to retrieve (via his locator communicator device 11c) specific locations of entertainment (i.e., movie theaters, casinos and the like) or specific events (i.e., a particular movie, a particular gaming event, and the like). The system Sc may also be used to alert the user of entertainment events based upon his user profile.

In another embodiment, the system 8c is used to track an individual ("locatee") based upon real-time location of the individual with or without the aid of a spatial range identifier. More specifically, the system 8c can be used to locate individuals traveling within a specified spatial range and notify a user when a particular individual has traveled outside of the specified spatial range. Additionally, the system 8c can be used to locate individuals regardless of their location or location relative to a designated spatial range.

The analysis unit 12c is loaded with a locatee user profile. Additionally, the analysis unit 12c may be loaded with a desired spatial range or path in which the locatee intends or is instructed to travel, i.e., the locatee intended range of travel and/or the locatee destination. The analysis unit 12c tracks the location of the locatee communicator device 11d and may alert the locator communicator device 11c when the locatee communicator device 11d travels outside of the locatee's intended range of travel and/or the locatee's intended destination. Additionally, the analysis unit 12c may alert the locator communicator device 11c when the locatee communicator device 11d travels to an area that is geo-referenced as a "good area" or "bad area." The system 8c may require the consent of the locatee to track the locatee via the locatee communicator device 11d, if desired.

For example, a parent may desire to track the travel of his child via the system 8c. The parent may input the child's intended destination (with or without a desired spatial range) into the locator communicator device 11c (which inputs the child's intended destination into the analysis unit 12c) so that the analysis unit 12c may track the travel of the child via the locatee communicator device 11d and may additionally alert the parent via his locator communicator device 11c if the child should travel outside the desired spatial range, if designated. Also, the analysis unit 12c may alert the parent via his locator communicator device 11c if the child travels into a geo-referenced "good area" (i.e., a school and the like) or "bad area" (i.e., a drinking bar and the like).

Additionally, a user may keep track (via his locator communicator device 11c) of a friend's ("locatee's") location by tracking the friend's locatee communicator device 11d in the same manner as described above in locations such as, for example, a mall, a football stadium, and the like. In this embodiment, a desired spatial range may or may not be designated. Additionally, the system 8c may require the consent of the locatee to track the locatee via the locatee communicator device 11d, if desired.

An optional aspect of the systems 8, 8a, 8b, and 8c is the performance of "operations research." The term "operations research" as used herein shall mean the geo-referencing of an object coupled with the time-tracking of the object. The term "geo-referencing" as used herein shall mean the determination of an object's position, O1, in relation to an X1,Y1, coordinate (expected location or expected route) and/or an X1,Y1,Z1, coordinate (expected location or expected route). The term "time-tracking" as used herein shall mean an initial departure time (Td) of an individual and/or object coupled with a predicted and/or expected arrival time (Te) of the individual and/or object. Operations research is applicable to each and every embodiment of the present invention described herein.

Operations research may be employed in various fields such as, for example, mobile commercial services (i.e., fleet management, asset location, and field sales and service) entertainment services (i.e., gaming services, individual location services, and flirting and other "social" services), security services (i.e., child-locator services, and mobile roadside assistance), information services (i.e., points-of-interest identification, GPS navigation support, weather information and data, and traffic information and data), or any other field desiring the employment and application of operations research.

For example, a child along with his locatee communicator device 11d leaves his home (X1, Y1) at 8:00 a.m. (Td) expected to arrive at school (X2, Y2) at 8:30 a.m. (Te). The child's parent, via his locator communicator device 11c, may keep track of the child's location (O1) by, for example, inputting (1) a unique identification code identifying the child's locatee communicator device 11c, (2) the child's intended destination (i.e., school) (with or without a desired spatial range), (3) the child's time of departure (Td) and (4) the child's estimated time of arrival (Te) into the locator communicator device 11c. The locator communicator device 11c then inputs the unique identification code identifying the child's locatee communicator device 11c, (2) the child's intended destination (i.e., school) (with or without a desired spatial range), (3) the child's time of departure (Td) and (4) the child's estimated time of arrival (Te) into the analysis unit 12c so that the analysis unit 12c may track the travel of the child via the locatee communicator device 11d and may additionally alert the parent via his locator communicator device 11c if the child should travel outside the desired spatial range, if designated, and/or may alert the parent should the child not arrive at school by the inputted estimated time of arrival (Te) and/or may alert the parent as to the child's actual time of arrival (Ta) to his intended destination and/or a deviation of the child's location from the expected location and/or expected route, if designated. Also, as discussed above, the analysis unit 12c may alert the parent via his locator communicator device 11c if the child travels into a geo-referenced "good area" (i.e., a school and the like) or "bad area" (i.e., a drinking bar and the like).

As another example, an employer uses the employer communicator device 11a to input the employee's intended destination (i.e., delivery destination) (with or without a desired spatial range) into the employer communicator device 11a (which inputs the employee's intended destination into the analysis unit 12a), the employee's time of departure (Td) and the employee's estimated time of arrival (Te) so that the analysis unit 12a may track the travel of the employee via the employee communicator device 11b and may additionally alert the employer via his employer communicator device 11a if the employee should travel outside the desired spatial range, if designated, and/or may alert the employer should the employee not arrive at the delivery destination by the inputted estimated time of arrival (Te) and/or may alert the employer as to the employee's actual time of arrival (Ta) to his intended destination and/or a deviation of the employee's location from the expected route, if designated. Also, as discussed above, the analysis unit 12a may alert the employer via his employer communicator device 11a if the employee travels into a geo-referenced "good area" or "bad area."

The entire contents of U.S. Pat. No. 6,505,123, U.S. Pat. No. 6,754,585, U.S. Pat. No. 6,836,730 and U.S. Ser. No. 11/035,654 filed on Jan. 14, 2004, are expressly incorporated herein by reference.

From the above description, it is clear that the present invention is well adapted to carry out the objects and to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed.

What is claimed is:

1. A system, comprising:
 a user profile database comprising:
  locator user profile criteria received from a locator, the locator user profile criteria including user profile information regarding the locator; and
  locatee user profile criteria received from a locatee;
 a communicator location database comprising:
  information indicative of a real-time spatial location of a locator communicator device associated with the locator; and
  information indicative of a real-time spatial location of a locatee communicator device associated with the locatee; and
 an analysis unit that:
  matches the locator user profile criteria and the locatee user profile criteria as well as the information indicative of the real-time spatial locations of the locator communicator device and the locatee communicator device to generate a data set of users having similar user profile criteria;
  outputs the locator user profile criteria for transmittal to the locatee in response to a determination that the data set of users includes the locatee;
  outputs the locatee user profile criteria for transmittal to the locator in response to a determination that the data set of users includes the locatee;
  receives permission from the locatee; and
  enables the locator to contact the locatee in response to the permission from the locatee.

2. The system of claim 1, wherein:
 the locator user profile includes a photograph received from the locator;
 the locatee user profile criteria includes a photograph received from the locatee;
 the locator user profile criteria output for transmittal to the locatee includes the photograph received from the locator: and
 the locatee user profile criteria output for transmittal to the locator includes the photograph received from the locatee.

3. The system of claim 1, wherein the locator user profile criteria includes personal characteristics and/or personality traits of the locator.

4. The system of claim 3, wherein the locator user profile criteria further includes desired personal characteristics and/or personality traits of the locatee.

5. The system of claim 1, wherein the locator user profile criteria includes personal characteristics and/or personality traits of the locator.

6. The system of claim 1, wherein the analysis unit receives the information indicative of the real-time spatial locations of the locator communicator device and the locatee communicator device automatically and continuously.

7. The system of claim 1, wherein the locator user profile criteria is received from the locator communicator device.

8. The system of claim 1, wherein the locatee user profile criteria is received from the locatee communicator device.

9. The system of claim 1, wherein the locator communicator device or the locatee communicator device comprises one of a computer, a personal digital assistant, a cellular phone, or a combination personal digital assistant and cellular phone.

10. The system of claim 1, wherein the analysis unit enables the locator to add information relating to the locatee which is hidden from the locatee and which is sharable with users other than the locatee.

11. A method, comprising:
 receiving locator user profile criteria from a locator, the locator user profile criteria including user profile information regarding the locator;
 receiving locatee user profile criteria from a locatee;
 storing the locator user profile criteria and the locatee user profile criteria in a user profile database;
 receiving information indicative of a real-time spatial location of a locator communicator device associated with the locator;
 receiving information indicative of a real-time spatial location of a locatee communicator device associated with the locatee;
 storing the information indicative of a real-time spatial location of a locator communicator device and the information indicative of a real-time spatial location of a locator communicator device in a user location database;
 matching, by an analysis unit, the locator user profile criteria and the locatee user profile criteria as well as the information indicative of the real-time spatial locations of the locator communicator device and the locatee communicator device to generate a data set of users having similar user profile criteria;
 outputting the locator user profile criteria for transmittal to the locatee in response to a determination that the data set of users includes the locatee;
 outputting the locatee user profile criteria for transmittal to the locator in response to a determination that the data set of users includes the locatee;
 receiving permission from the locatee; and
 enabling the locator to contact the locatee in response to the permission from the locatee.

12. The method of claim 11, wherein:
 the locator user profile includes a photograph received from the locator;
 the locatee user profile criteria includes a photograph received from the locatee;
 the locator user profile criteria output for transmittal to the locatee includes the photograph received from the locator: and the locatee user profile criteria output for transmittal to the locator includes the photograph received from the locatee.

13. The method of claim 11, wherein the locator user profile criteria includes personal characteristics and/or personality traits of the locator.

14. The method of claim 13, wherein the locator user profile criteria further includes desired personal characteristics and/or personality traits of the locatee.

15. The method of claim 11, wherein the locator user profile criteria includes personal characteristics and/or personality traits of the locator.

16. The method of claim 11, wherein the receiving the information indicative of the real-time spatial locations of the locator communicator device and the locatee communicator device comprises automatically and continuously receiving the information indicative of the real-time spatial locations of the locator communicator device and the locatee communicator device.

17. The method of claim 11, wherein the locator user profile criteria is received from the locator communicator device.

18. The method of claim 11, wherein the locatee user profile criteria is received from the locatee communicator device.

19. The method of claim 11, wherein the locator communicator device or the locatee communicator device comprises one of a computer, a personal digital assistant, a cellular phone, or a combination personal digital assistant and cellular phone.

20. The method of claim 11, further comprising:
enabling the locator to add information relating to the locatee which is hidden from the locatee and which is sharable with users other than the locatee.

* * * * *